(12) United States Patent
Sawasaki et al.

(10) Patent No.: US 7,826,027 B2
(45) Date of Patent: Nov. 2, 2010

(54) SUBSTRATE FOR LIQUID CRYSTAL DISPLAY, LIQUID CRYSTAL DISPLAY HAVING THE SAME AND METHOD OF MANUFACTURING THE SAME

(75) Inventors: Manabu Sawasaki, Kawasaki (JP); Yuichi Inoue, Kawasaki (JP); Masakazu Shibasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/720,706

(22) Filed: Nov. 24, 2003

(65) Prior Publication Data

US 2004/0114081 A1 Jun. 17, 2004

Related U.S. Application Data

(62) Division of application No. 10/166,119, filed on Jun. 10, 2002, now Pat. No. 7,145,619.

(30) Foreign Application Priority Data

Jun. 29, 2001 (JP) ............................. 2001-199313
Apr. 22, 2002 (JP) ............................. 2002-119774

(51) Int. Cl.
*G02F 1/1339* (2006.01)
*G02F 1/1335* (2006.01)
*G02F 1/1343* (2006.01)

(52) U.S. Cl. ..................... 349/156; 349/106; 349/139

(58) Field of Classification Search ................ 349/158, 349/106–109, 155–156, 129, 139
See application file for complete search history.

(56) References Cited

U.S. PATENT DOCUMENTS 5,430,562 A 7/1995 Fushimi et al. ............... 359/40
5,734,455 A * 3/1998 Yoshida et al. ............... 349/99
5,764,318 A * 6/1998 Kurematsu et al. ........... 349/5
5,818,550 A * 10/1998 Kadota et al. ................ 349/43
5,995,172 A * 11/1999 Ikeda et al. .................. 349/12
6,147,729 A 11/2000 Kurauchi et al. ............ 349/106
6,323,921 B1 * 11/2001 Kurauchi et al. ............ 349/106

(Continued)

FOREIGN PATENT DOCUMENTS

JP 5-072626 3/1993

(Continued)

*Primary Examiner*—Dung T. Nguyen
(74) *Attorney, Agent, or Firm*—Greer, Burns & Crain, Ltd.

(57) ABSTRACT

It is an object of the invention to provide a substrate for a liquid crystal display, a liquid crystal display having the same, and a method of manufacturing the same which make it possible to provide a display having high luminance and preferable display characteristics to be used in display sections of information apparatuses and the like. Each pixel is defined by gate bus lines extending in the horizontal direction and drain bus lines extending in the vertical direction. TFTs are formed in the vicinity of intersections between the bus lines, and resin overlap sections for shielding the TFTs from light are formed above the same. No black matrix is formed on a common electrode substrate which is provided in a face-to-face relationship with a TFT substrate, and the bus lines and the resin overlap sections formed on the TFT substrate function as a black matrix.

11 Claims, 22 Drawing Sheets

U.S. PATENT DOCUMENTS

| | | |
|---|---|---|
| 6,342,938 B1 | 1/2002 | Song et al. ............... 349/143 |
| 6,400,440 B1 | 6/2002 | Colgan et al. |
| 6,493,050 B1 * | 12/2002 | Lien et al. ............... 349/106 |
| 6,525,791 B1 | 2/2003 | Tsuda et al. |
| 6,573,964 B1 | 6/2003 | Takizawa et al. ........... 349/129 |
| 6,593,988 B1 | 7/2003 | Liu et al. |
| 6,671,025 B1 * | 12/2003 | Ikeda et al. ............... 349/156 |
| 6,750,934 B2 | 6/2004 | Sakamoto et al. |
| 6,825,906 B2 | 11/2004 | Kim et al. ............... 349/129 |
| 6,879,364 B1 | 4/2005 | Sasaki et al. ............... 349/129 |
| 6,922,223 B2 | 7/2005 | Ma et al. ............... 349/129 |
| 6,992,329 B2 | 1/2006 | Wu et al. ............... 257/59 |
| 7,167,224 B1 | 1/2007 | Takeda et al. ............... 349/139 |

FOREIGN PATENT DOCUMENTS

| | | |
|---|---|---|
| JP | 6-222355 | 8/1994 |
| JP | 8-122823 | 5/1995 |
| JP | 11-258606 | 9/1999 |
| JP | 2000-187223 | 7/2000 |
| JP | 2000-231098 | 8/2000 |
| JP | 2000-267073 | 9/2000 |
| JP | 2000-338525 | 12/2000 |
| JP | 2001-083518 | 3/2001 |
| JP | 2001-083520 | 3/2001 |
| JP | 2001-083521 | 3/2001 |
| JP | 2001-108823 | 4/2001 |
| KR | 1998-025016 | 7/1998 |
| KR | 1999-33185 | 7/1998 |
| KR | 2000-23106 | 4/2000 |
| KR | 2000-31955 | 6/2000 |
| KR | 2001-39260 | 5/2001 |

* cited by examiner

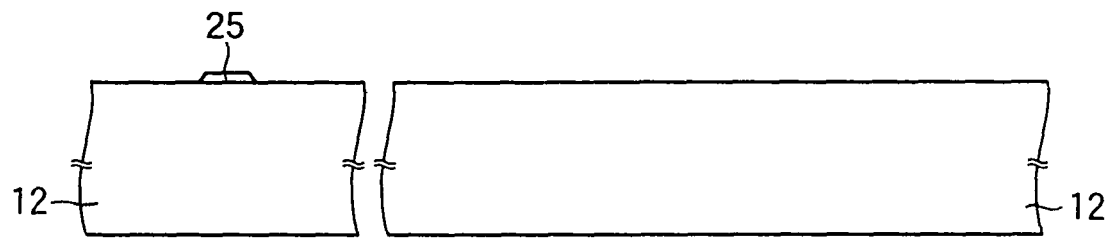
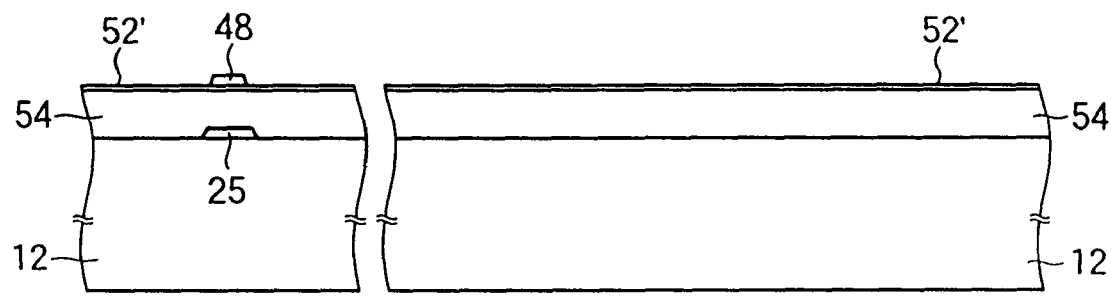
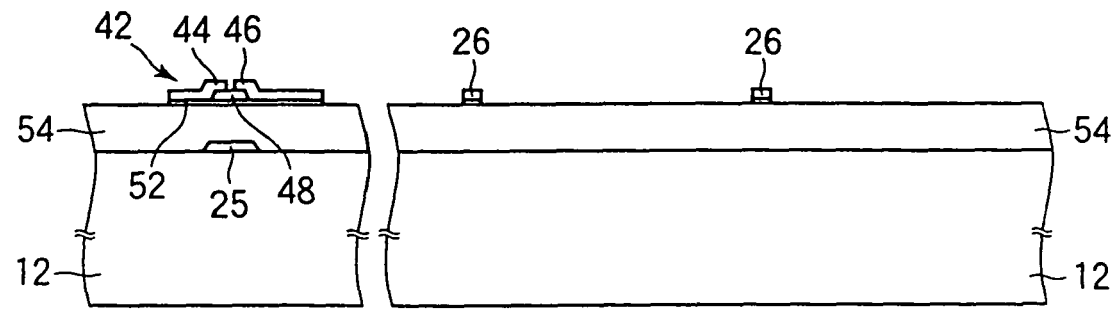

FIG.31A
FIG.31B
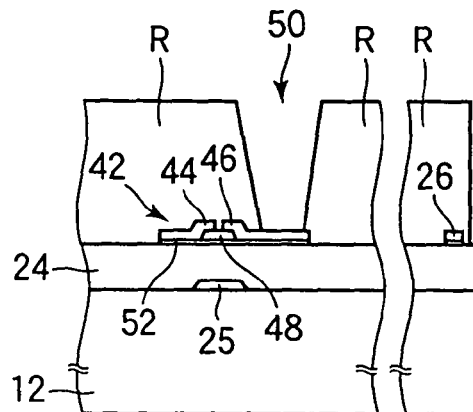
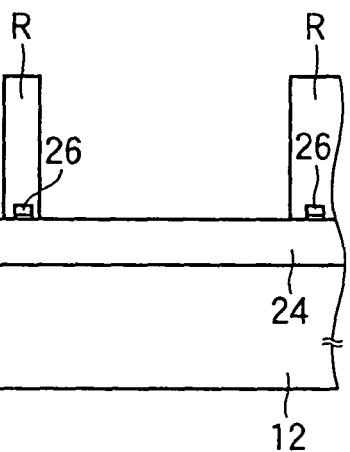
FIG.32A
FIG.32B
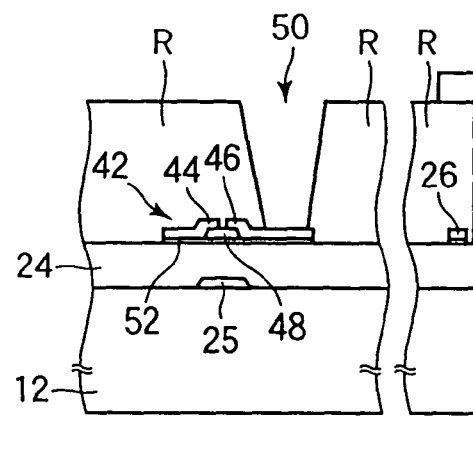
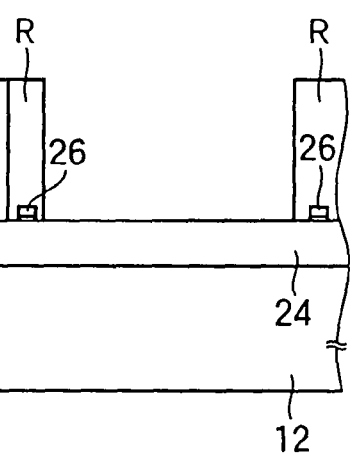
FIG.33A
FIG.33B
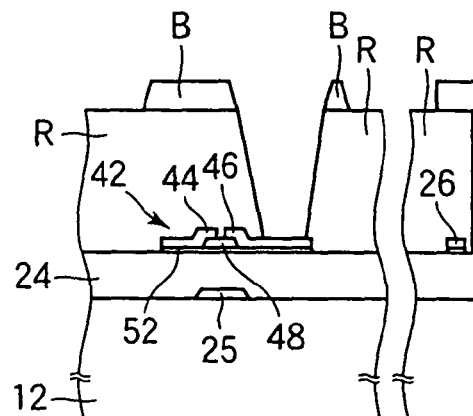
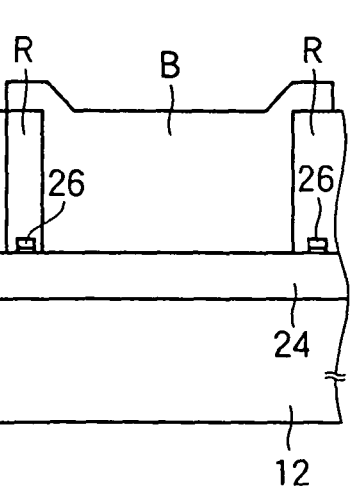

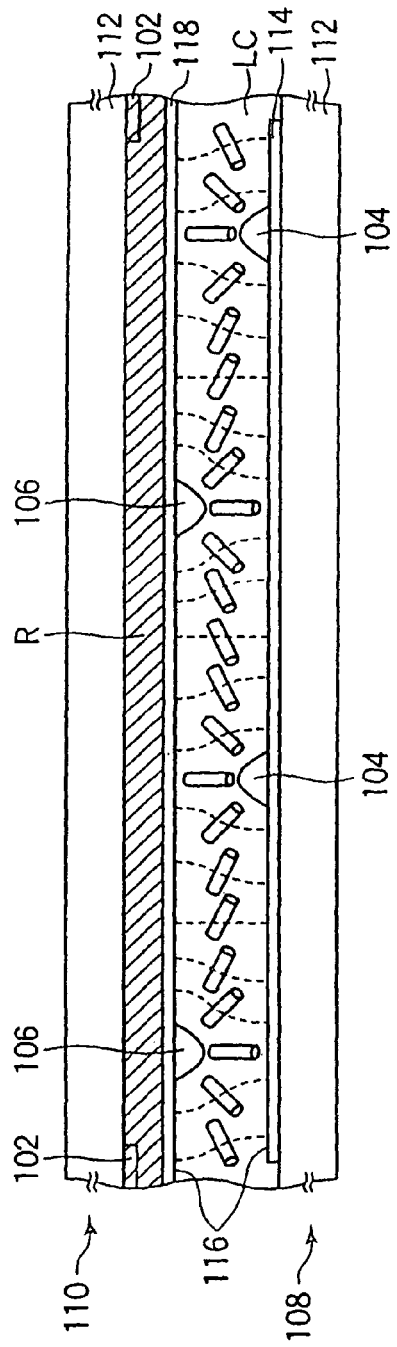
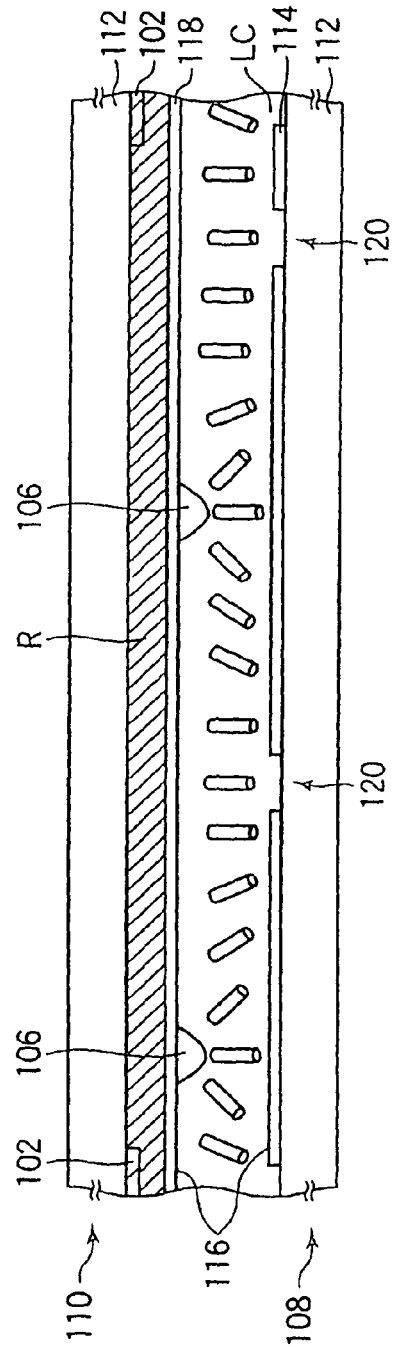

SUBSTRATE FOR LIQUID CRYSTAL DISPLAY, LIQUID CRYSTAL DISPLAY HAVING THE SAME AND METHOD OF MANUFACTURING THE SAME

This is a divisional of application Ser. No. 10/166,119, filed Jun. 10, 2002 now U.S. Pat. No. 7,145,619.

BACKGROUND OF THE INVENTION

1. Field of the Invention

The present invention relates to a liquid crystal display substrate that forms a part of a liquid crystal display used in a display section of an information apparatus or the like, a liquid crystal display having the same and a method of manufacturing the same.

2. Description of the Related Art

In general, a liquid crystal display comprises two substrates having a transparent electrode and a liquid crystal sealed between the two substrates. The liquid crystal is driven by applying a voltage between the two transparent electrodes to control the transmittance of light through the liquid crystal, which allows a desired image to be displayed. An active matrix liquid crystal display is comprised of a TFT substrate having thin film transistors (TFTs) for switching respective pixels formed thereon and a common electrode substrate having a common electrode formed thereon. A recent increase in the need for liquid crystal displays has resulted in diverse requirements for liquid crystal displays. In particular, there are strong demands for improvements of viewing angle characteristics and display quality, and VA (vertically aligned) mode liquid crystal displays are regarded as promising means for satisfying such demands.

A VA mode liquid crystal display is comprised of two substrates which have been subjected to a vertically aligning process on surfaces thereof facing each other and a liquid crystal having negative dielectric anisotropy sealed between the two substrates. The liquid crystal molecules of the liquid crystal are characterized by homeotropic alignment and are aligned substantially perpendicularly to the substrate surfaces when no voltage is applied between the electrodes. They are aligned substantially in parallel with the substrate surfaces when a predetermined voltage is applied between the electrodes and are aligned at an angle to the substrate surfaces when a voltage lower than said voltage is applied.

MVA (multi-domain vertical alignment) type liquid crystal displays are recently attracting attention from the viewpoint of improvement of viewing angle characteristics of liquid crystal displays. In the case of an MVA type display, a pixel is divided into a plurality of domains using alignment regulating structures such as linear protrusions and slits provided on two substrates to achieve separate alignment in which liquid crystal molecules are tilted in a different direction in each domain.

FIG. 35 shows a configuration of an MVA type liquid crystal display and shows an arrangement of linear protrusion formed as alignment regulating structures on two substrates. FIG. 35 shows three pixels in red (R), green (G) and blue (B). As shown in FIG. 35, linear protrusions 104 are formed on a TFT substrate 108 and linear protrusions 106 are formed on a common electrode substrate 110. The linear protrusions 104 and 106 are formed at an angle to the pixels. Each of the R, G and B pixel regions is defined by a black matrix (BM) 102 formed on the common electrode substrate 110. The BM 102 serves as a light shield for a storage capacity bus line extending across each pixel substantially in the middle thereof and a storage capacity electrode located above the same (both of which are not shown).

FIG. 36 is a sectional view of the liquid crystal display taken along the line X-X in FIG. 35. As shown in FIG. 36, the TFT substrate 108 has a pixel electrode 114 formed for each pixel on a glass substrate 112. The figure omits an insulation film, drain bus lines, a protective film, and soon formed on the glass substrate 112. The linear protrusions 104 are formed on the pixel electrodes 114. A vertical alignment film 116 is formed to cover the pixel electrodes 114 and linear protrusions 104 entirely. The common electrode substrate 110 has the BM 102 formed on the glass substrate 112. Resin color filter (CF) layers R, G and B (FIG. 36 shows the filters G and B only) are formed in each of the pixel regions defined by the BM 102 on the glass substrate 112. A common electrode 118 is formed on the region CF layers R, G and B, and the linear protrusions 106 are formed on the common electrode 118. Further, a vertical alignment film 116 is formed to cover the common electrode 118 and linear protrusions 106 entirely. Spherical spacers 122 made of plastic or glass for maintaining a gap (cell gap) between the substrates 108 and 110 and a liquid crystal LC is sealed between the TFT substrate 108 and common electrode substrate 110.

FIG. 37 is a sectional view of the liquid crystal display taken along the line Y-Y in FIG. 35, and it shows a state of the liquid crystal LC when no voltage is applied. As shown in FIG. 37, liquid crystal molecules (represented by columns in the figure) are aligned substantially perpendicularly to the vertical alignment films 116 on the two substrates 108 and 110. Therefore, liquid crystal molecules in the regions where the linear protrusions 104 and 106 are formed are aligned substantially perpendicularly to the surface of the linear protrusions 104 and 106 and are aligned at a slight angle to the normal of the two substrates 108 and 110. Since polarizers (not shown) are provided in a crossed Nicols configuration outside the two substrates 108 and 110, black display is achieved when no voltage is applied.

FIG. 38 is a sectional view of the liquid crystal display taken along the line Y-Y in FIG. 35 similarly to FIG. 37, and it shows a state of the liquid crystal LC when a voltage is applied. The broken lines in the figure represent lines of electric force between the pixel electrodes 114 and common electrode 118. As shown in FIG. 38, when a voltage is applied between the pixel electrodes 114 and common electrode 118, the electric field is distorted in the vicinity of the linear protrusions 104 and 106 which are made of a dielectric material. As a result, the tilting angles of liquid crystal molecules having negative dielectric anisotropy are regulated, and the tilting angles can be controlled depending on the field intensity to display gray shades.

At this time, if the linear protrusions 104 and 106 are provided in linear configurations as shown in FIG. 35, liquid crystal molecules in the vicinity of the linear protrusions 104 and 106 are tilted in two directions which are orthogonal to the extending directions of the linear protrusions 104 and 106, the tilting directions being symmetrically defined about the linear protrusions 104 and 106. Since the liquid crystal molecules in the vicinity of the linear protrusions 104 and 106 are at a slight angle to a direction perpendicular to the two substrates 108 and 110 even when no voltage is applied, they are quickly tilted in response to the field intensity. The tilting directions of liquid crystal molecules in the neighborhood are sequentially determined in accordance with the behavior of the above-mentioned liquid crystal molecules, and the tilting angles depend on the field intensity. As a result, alignment separation is achieved at the linear protrusions 104 and 106.

FIG. 39 is a sectional view taken along a line Y-Y of a liquid crystal display as shown in FIG. 35 in which slits 120 are formed in place of the linear protrusions 104, the figure showing a state of the display when no voltage is applied. As shown in FIG. 39, the slits 120 which are alignment regulating structures are formed by removing the pixel electrodes 114. Liquid crystal molecules are aligned substantially perpendicularly to the vertical alignment films 116 on the two substrates 108 and 110 similarly to the liquid crystal molecules shown in FIG. 37.

FIG. 40 is a sectional view of the liquid crystal display taken along the line Y-Y similarly to FIG. 39, and it shows a state of a liquid crystal LC when a voltage is applied. As shown in FIG. 40, lines of electric force substantially similar to those in the regions where the linear protrusions 104 are formed as shown in FIG. 38 are formed in the regions where the slits 120 are formed. As a result, alignment separation is achieved about the linear protrusions 106 and slits 120. FIGS. 37 and 40 omit the spherical spacers 122 for maintaining a cell gap.

FIG. 41 is a sectional view of the liquid crystal display taken along the line Z-Z in FIG. 35 showing the neighborhood of a drain bus line 126. As shown in FIG. 41, the TFT substrate 108 has an insulation film 124 covering an entire surface of the glass substrate 112. The drain bus line 126 is formed on the insulation film 124. A protective film 128 is formed on the entire surface of the drain bus line 126. A pixel electrode 114 for each pixel is formed on the protective film 128. A black matrix BM 102 is formed on a common electrode substrate 110 provided in a face-to-face relationship with the TFT substrate 108 such that it serves as a light shield for regions on the TFT substrate 108 where no pixel electrode 114 is formed (edges of pixel regions).

The conventional MVA type liquid crystal display has the problem of darkness of display because of low transmittance of the panel. The low panel transmittance is attributable to various factors including a reduction in the numerical aperture caused by misalignment between the TFT substrate 108 and common electrode substrate 110, a reduction in the numerical aperture attributable to the alignment regulating structures (the linear protrusions 104 and 106 or slits 120), and irregularities in the alignment of the liquid crystal in the vicinity of the spherical spacers 122.

Because of significantly improved viewing angle characteristics, MVA type liquid crystal displays are preferably used as monitors for personal computers and the like for which high luminance has relatively low importance. However, in order to use them as display sections of DVD (digital versatile disk) players or televisions for which high luminance is an important requirement, it is necessary to provide a brighter back-light or to use a special sheet for aligning light-emitting directions to improve luminance in a particular direction. This has resulted in the problem of an increase in the manufacturing cost.

Further, the formation of linear protrusions, an insulation layer, and so on as alignment regulating structures increases manufacturing steps when compared to manufacturing steps for normal substrates, which also-results in an increase in the manufacturing cost.

SUMMARY OF THE INVENTION

It is an object of the invention to provide a substrate for a liquid crystal display with which a display having high luminance and preferable display characteristics can be obtained, a liquid crystal display having the same, and a method for manufacturing the same.

The above-described object is achieved by a liquid crystal display substrate, characterized in that it comprises a substrate which sandwiches a liquid crystal having negative dielectric anisotropy in combination with an opposite substrate provided in a face-to-face relationship, a plurality of gate bus lines formed on the substrate, a plurality of drain bus lines formed on the substrate such that they intersect the gate bus lines, pixel regions defined by the gate bus lines and the drain bus lines, a thin film transistor formed in each of the pixel regions, a resin color filter layer formed in each of the pixel regions, a pixel electrode formed in each of the pixel regions, and an alignment regulating structure formed on the substrate for regulating the alignment of the liquid crystal.

The above-described object is achieved by a liquid crystal display, characterized in that it comprises: a thin film transistor substrate including a first substrate, a plurality of bus lines formed on the first substrate such that they intersect each other, pixel regions defined by the bus lines, a thin film transistor formed in each of the pixel regions, a resin color filter layer formed in each of the pixel regions, and a pixel electrode formed in each of the pixel regions; a common electrode substrate including a second substrate different from the first substrate in the thickness or material and a common electrode formed on the second substrate, the common electrode substrate being provided in a face-to-face relationship with the first substrate; and a liquid crystal sealed between the thin film transistor substrate and the common electrode substrate.

Further, the above-described object is achieved by a liquid crystal display substrate, characterized in that it comprises a substrate which sandwiches a liquid crystal in combination with an opposite substrate provided in a face-to-face relationship therewith, a plurality of gate bus lines formed on the substrate, a plurality of drain bus lines formed on the substrate such that they intersect the gate bus lines, pixel regions defined by the gate bus lines and the drain bus lines, a thin film transistor formed in each of the pixel regions, a resin color filter layer formed in each of the pixel regions, a pixel electrode formed in each of the pixel regions, and a resin layer formed to cover source and drain electrodes of the thin film transistor and the drain bus lines.

BRIEF DESCRIPTION OF THE DRAWINGS

FIGS. 11A and 11B are sectional views taken at a manufacturing step showing a method of manufacturing the substrate for a liquid crystal display according to Embodiment 1-1 in the first mode for carrying out the invention;

FIGS. 12A and 12B are sectional views taken at a manufacturing step showing the method of manufacturing the substrate for a liquid crystal display according to Embodiment 1-1 in the first mode for carrying out the invention;

FIGS. 13A and 13B are sectional views taken at a manufacturing step showing the method of manufacturing the substrate for a liquid crystal display according to Embodiment 1-1 in the first mode for carrying out the invention;

FIGS. 31A and 31B are sectional views taken at a manufacturing step showing the method of manufacturing the liquid crystal display according to Embodiment 3-1 in the third mode for carrying out the invention;

FIGS. 32A and 32B are sectional views taken at a manufacturing step showing the method of manufacturing the liquid crystal display according to Embodiment 3-1 in the third mode for carrying out the invention;

FIGS. 33A and 33B are sectional views taken at a manufacturing step showing the method of manufacturing the liquid crystal display according to Embodiment 3-1 in the third mode for carrying out the invention;

FIG. 38 is a sectional view showing the configuration of the conventional liquid crystal display;

FIG. 39 is a sectional view showing the configuration of the conventional liquid crystal display;

DETAILED DESCRIPTION OF THE PREFERRED EMBODIMENTS

First Mode for Carrying Out the Invention

Figure 1:
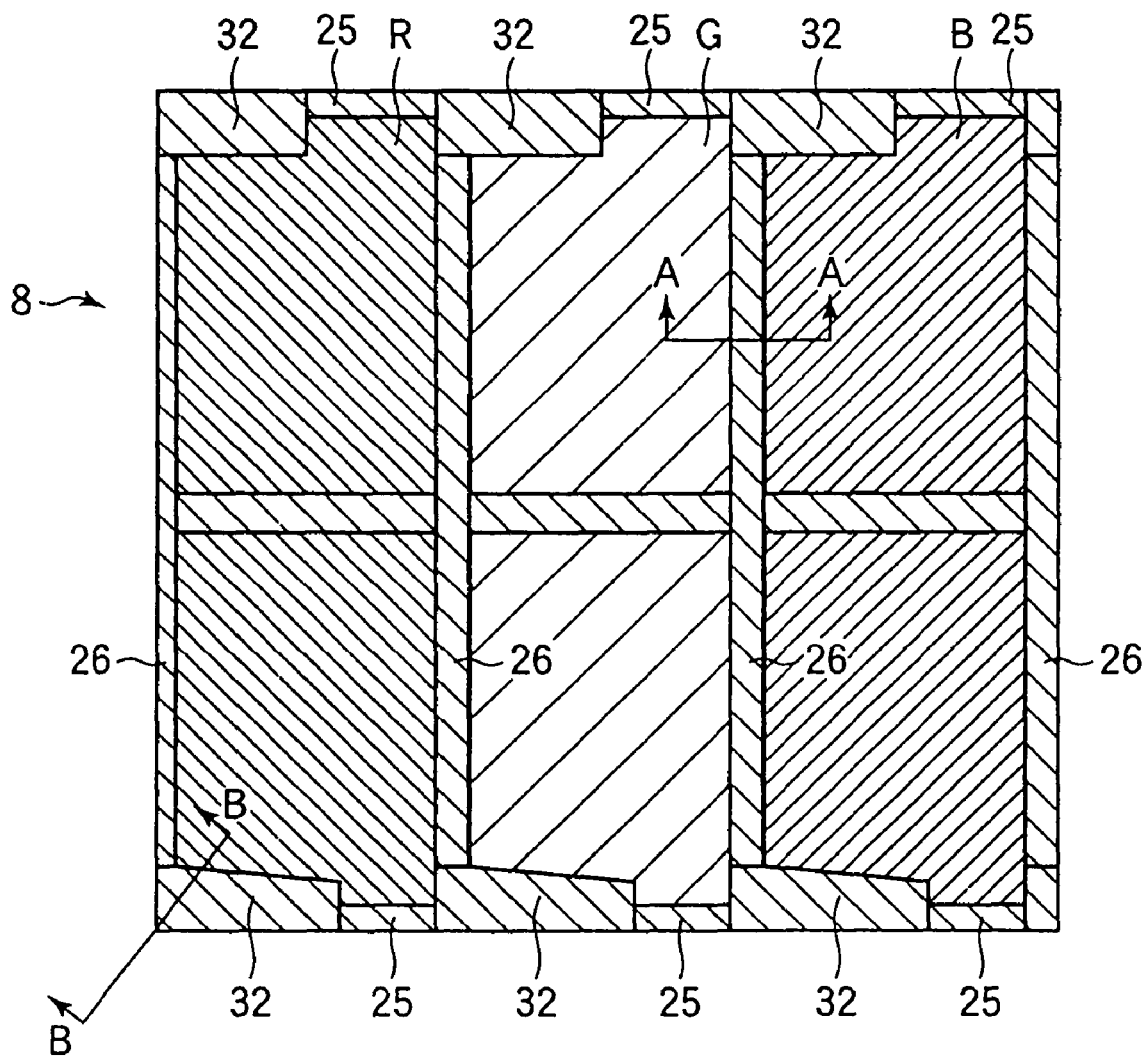
FIG. 1 shows a configuration of a liquid crystal display in a first mode for carrying out the invention.

A description will be made with reference to FIGS. 1 through 22 and FIG. 42 on a substrate for a liquid crystal display in a first mode for carrying out the invention, a liquid crystal display having the same, and a method of manufacturing the same. A first basic configuration in the present mode for carrying out the invention will be described with reference to FIGS. 1 and 2. FIG. 1 shows three pixels in R, G and B on a TFT substrate 8. As shown in FIG. 1, the pixels are defined by gate bus lines 25 extending in the horizontal direction in the figure and drain bus lines 26 extending in the vertical direction in the figure. TFTs (no shown) are formed in the vicinity of intersections between the bus lines 25 and 26. Above the TFTs, in order to prevent light from impinging upon the TFTS, resin overlap sections 32 are formed in which at least two out of resin CF layers R, G and B are overlapped with each other. In the liquid crystal display in the present mode for carrying out the invention, no black matrix is formed on a common electrode substrate which is provided in a face-to-face relationship with the TFT substrate 8, and the bus lines 25 and 26 and the resin overlap sections 32 formed on the TFT substrate 8 provides the function of a black matrix. Light can be blocked by forming any one of the resin CF layers R, G and B on the TFTs instead of the resin overlap sections 32 shown in FIG. 1.

Figure 2:
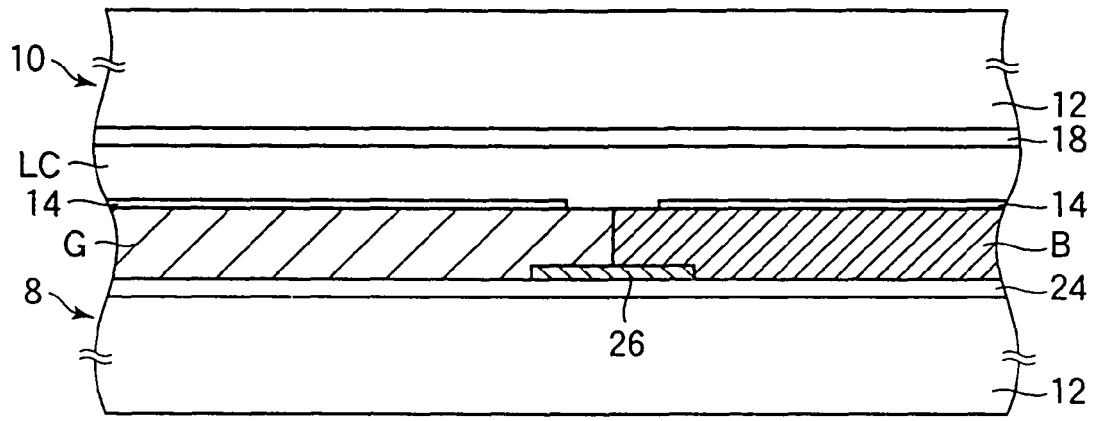
FIG. 2 is a sectional view showing a first basic configuration of a substrate for a liquid crystal display in the first mode for carrying out the invention, a liquid crystal display having the same, and a method of manufacturing the same.

FIG. 2 is an illustration showing a first basic configuration of a substrate for a liquid crystal display in the present mode for carrying out the invention and a liquid crystal display having the same is a sectional view of the liquid crystal display taken along the line A-A in FIG. 1. As shown in FIG. 2, the TFT substrate 8 has an insulation film 24 formed on a substantially entire surface of a glass substrate 12. The drain bus lines 26 are formed on the insulation film 24. The resin CF layers R, G and B (FIG. 2 shows the layers G and B only) are formed on the drain bus lines 26 (a CF-on-TFT structure). A pixel electrode 14 for each pixel is formed on the resin CF layers R, G and B. A common electrode substrate 10 provided in a face-to-face relationship with the TFT substrate 8 is comprised of a glass substrate 12 and a common electrode 18 formed on an entire surface thereof. No black matrix is formed on the common electrode substrate 10. A vertical alignment film (not shown) is formed to cover the pixel electrode 14 and common electrode 18 entirely. A liquid crystal layer LC is sealed between the TFT substrate 8 and common electrode substrate 10.

Figure 41:
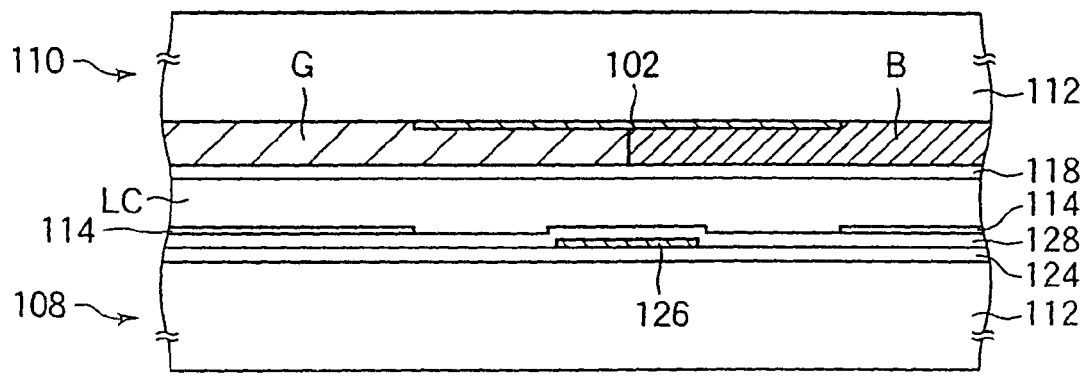
FIG. 41 is a sectional view showing the configuration of the conventional liquid crystal display.

In the conventional liquid crystal display shown in FIG. 41, a capacity is formed between the pixel electrode 114 and drain bus line 126 with the protective film 128 sandwiched as a dielectric material if the pixel electrode 114 is formed such that it extends above the drain bus line 126. It is therefore necessary to provide a predetermined gap extending in parallel with the substrate surface between the pixel electrode 114 and drain bus line 126.

On the contrary, in the liquid crystal display in the present mode for carrying out the invention shown in FIG. 2, the resin CF layers R, G and B are formed between the pixel electrodes 114 and drain bus lines 126. Since the resin CF layers R, G and B are applied and formed using a spin coat process or the like, they can be easily formed with a great thickness compared to the protective film 128 that is formed using a CVD (chemical vapor deposition) process. It is therefore possible to reduce any electrostatic capacity generated between the drain bus lines 26 and pixel electrodes 14. Since this makes it possible to form the pixel electrodes 14 in an overlapping relationship with the drain bus lines 26 in the direction perpendicular to the substrate surface, there is no need for forming a black matrix on the common electrode substrate 10, which improves the numerical aperture. Further, since the drain bus lines 26 serve as a black matrix to eliminate any need for providing a black matrix on the common electrode substrate 10, the number of manufacturing steps is reduced. This also eliminates any reduction in the numerical aperture attributable to misalignment between the TFT substrate 8 and common electrode substrate 10.

The CF-on-TFT structure shown in FIG. 2 is suitable for a TN normally white mode liquid crystal display in which leakage of light can occur when black is displayed unless pixel electrodes 14 are formed such that edges of the same overlap drain bus lines 26. However, in order to suppress a capacity formed in a region where a pixel electrode 14 and a drain bus line 26 overlap each other, the resin CF layers R, G and B must be formed with a considerably great thickness. This results in a problem in that the CF-on-TFT structure necessitates a manufacturing process that is more complicated than forming the resin CF layers R, G and B on the opposite substrate. Further, in order to block light with the drain bus lines 26 reliably (bus line light-blocking), the resin CF layers R, G and B must be formed such that their edges are accurately aligned with the drain bus lines 26. Therefore, in the case of drain bus lines with a very small line width, a proximity exposure apparatus which is normally used for forming the resin CF layers R, G and B may fail to achieve sufficient alignment. On the contrary, the use of a stepper or mirror-projection type aligner having excellent aligning accuracy can result in an increase in the manufacturing cost of the CF-on-TFT structure.

Figure 3:
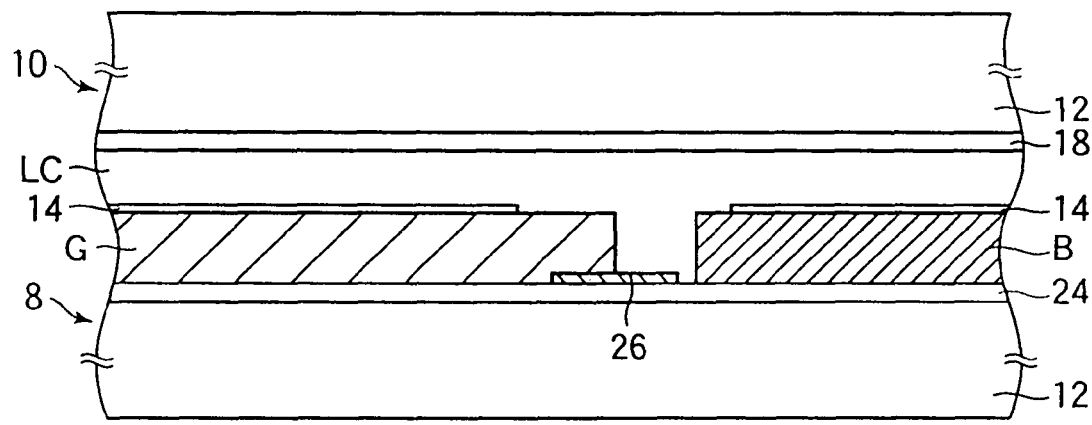
FIG. 3 is a sectional view showing a modification of the first basic configuration of a substrate for a liquid crystal display in the first mode for carrying out the invention, a liquid crystal display having the same, and a method of manufacturing the same.

FIG. 3 shows a modification of the first basic configuration shown in FIG. 2. As shown in FIG. 3, the pixel electrodes 14 are formed such that predetermined gaps in the direction of the substrate surface are kept between edges of the pixel electrodes 14 and drain bus line 26 in order to prevent the pixel electrodes 14 from overlapping the drain bus line 26 when viewed in the direction perpendicular to the substrate surface. An edge of the resin CF layer G is formed on the drain bus line 26, however, an edge of the resin CF layer B is misaligned with the top of the drain bus line 26 because of a shift during patterning. However, in the case of a MVA type normally black mode liquid crystal display which displays black when no voltage is applied, even if a pixel electrode 14 is formed with a predetermined gap from a drain bus line 26 such that they do not overlap each other, the problem of leakage light will not occur because such a gap region appears in black when no voltage is applied. Further, since no capacity is generated because no overlap region is formed between the pixel electrode 14 and drain bus line 26, resin CF layers R, G and B can be as thin as desired. Even when the resin CF layers R, G and B are formed such that their edges are misaligned with the top of the drain bus line 26 as shown in FIG. 3, no light leaks as long as the edges of the resin CF layers R, G and B are closer to the drain bus line 26 than the edges of the pixel electrodes 14. Since this makes it possible to provide a great margin for alignment during the patterning of the resin CF layers R, G and B, the CF-on-TFT structure can be obtained at a low cost using a normal proximity exposure apparatus.

Figure 4:
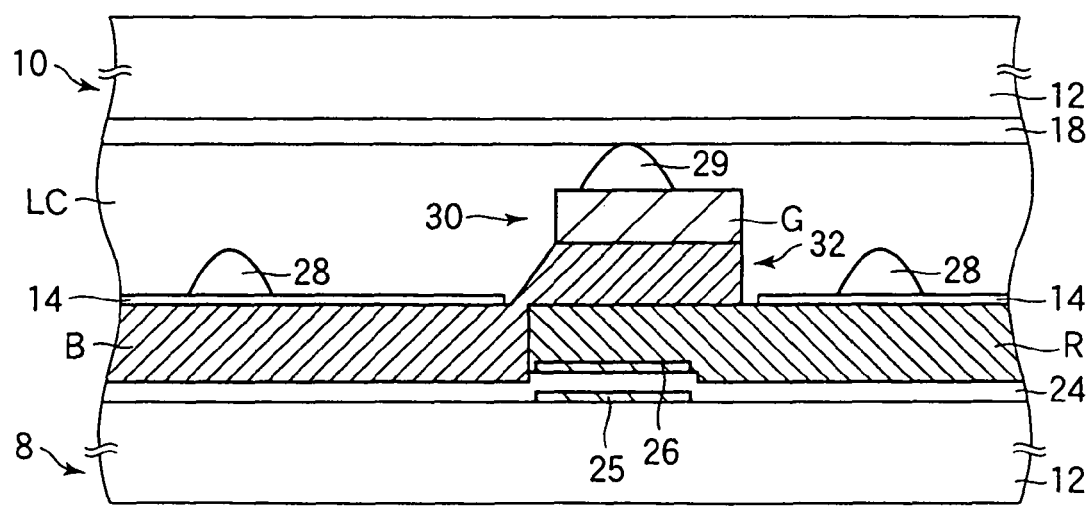
FIG. 4 is a sectional view showing a second basic configuration of a substrate for a liquid crystal display in the first mode for carrying out the invention, a liquid crystal display having the same, and a method of manufacturing the same.

FIG. 4 shows a second basic configuration of the substrate for a liquid crystal display in the present mode for carrying out the invention and the liquid crystal display having the same, FIG. 4 showing a sectional view of the liquid crystal display taken along the line B-B in FIG. 1. As shown in FIG. 4, the liquid crystal display has linear protrusions 28 as alignment regulating structures formed on the pixel electrodes 14. The resin CF layers R, B and G are laminated in the same order in the vicinity of the intersection between the gate bus line 25 and drain bus line 26 to form a resin overlap section 32 to serve as a black matrix. A protrusion 29 which does not function as an alignment regulating structure is formed on the resin overlap section 32. The protrusion 29 is formed simultaneously with the linear protrusions 28 from the same material as that of the latter. The resin overlap section 32 between the resin layers forming a part of the TFT substrate 8 and the protrusion 29 are laminated to form a columnar spacer 30 which maintains a cell gap between the TFT substrate and the common electrode substrate 10 provided in a face-to-face relationship.

In the second configuration in the present mode for carrying out the invention, the columnar spacer is formed by laminating the resin CF layers and so on forming a part of the TFT substrate 8. Since this reduces the number of manufacturing steps, the manufacturing cost can be reduced. Further, since this makes it possible to reduce leakage of light and irregularities of alignment that can occur in the vicinity of dispersed spacers having a spherical configuration or the like, preferable display characteristics can be achieved.

Figure 5:
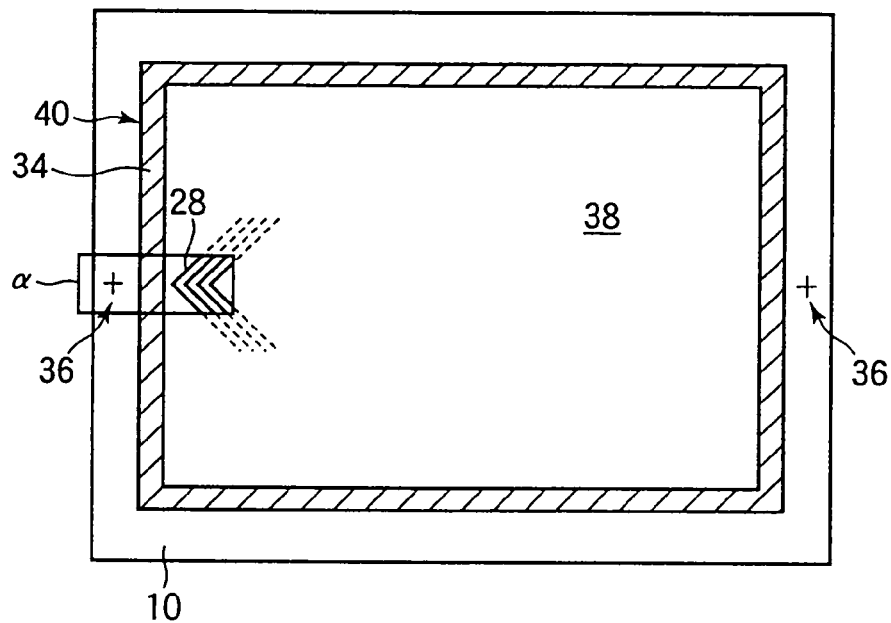
FIG. 5 shows a third basic configuration of a substrate for a liquid crystal display in the first mode for carrying out the invention.

FIG. 5 shows a third configuration of the substrate for a liquid crystal display in the present mode for carrying out the invention. A frame pattern 34 for, shielding edges of a display area 38 from light is formed in a frame region 40 of the common electrode substrate 10. For example, a cross-shaped alignment mark used for combining the same substrate with the TFT substrate 8 (which is not shown in FIGS. 5 and 6B) in a face-to-face relationship is formed outside the frame region 40.

Figure 6A:
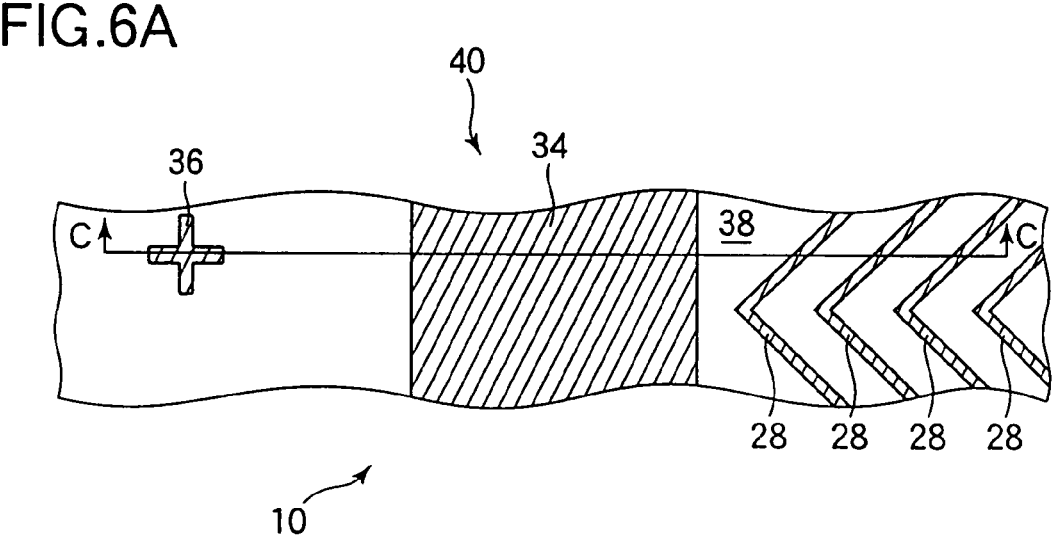
FIGS. 6A and 6B show the third basic configuration of a substrate for a liquid crystal display in the first mode for carrying out the invention.
Figure 6B:
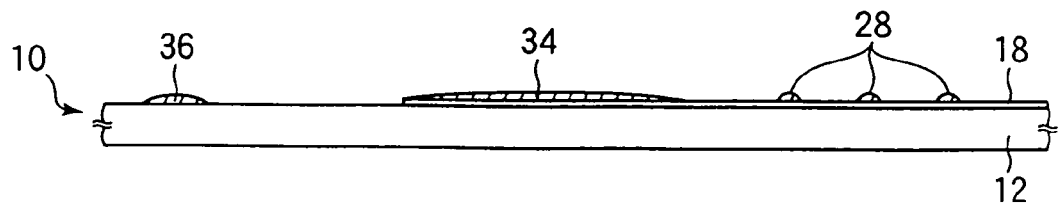

FIG. 6A is an enlarged view of the region a of the common electrode substrate 10 shown in FIG. 5. FIG. 6B shows a section of the common electrode substrate 10 taken along the line C-C in FIG. 6A. As shown in FIGS. 6A and 6B, a common electrode 18 is formed in the display area 38 on the glass substrate 12 and in the frame region 40 at the edges of the display area 38. Linear protrusions 28 are formed on the common electrode 18 in the display area 38 at an angle to an edge of the display area 38 using a black resist (black resin) or the like. A frame pattern 34 for shielding the edges of the display area 38 from light is formed on the common electrode 18 in the frame region 40 simultaneously with the linear protrusions 28 from the same material. An alignment mark 36 is formed simultaneously with the linear protrusions 28 from the same material on the left side of the frame region 40 in the figures.

In the third basic configuration in the present mode for carrying out the invention, since the: frame pattern 34 and alignment mark 36 are formed simultaneously with alignment regulating structures from the same material, the number of steps for manufacturing the common electrode substrate 10 is reduced to allow a reduction in the manufacturing cost.

The substrate for a liquid crystal display in the present mode for carrying out the invention and the liquid crystal display having the same will now be more specifically described with reference to Embodiments 1-1, 1-2 and 1-3.

Embodiment 1-1

Figure 7:
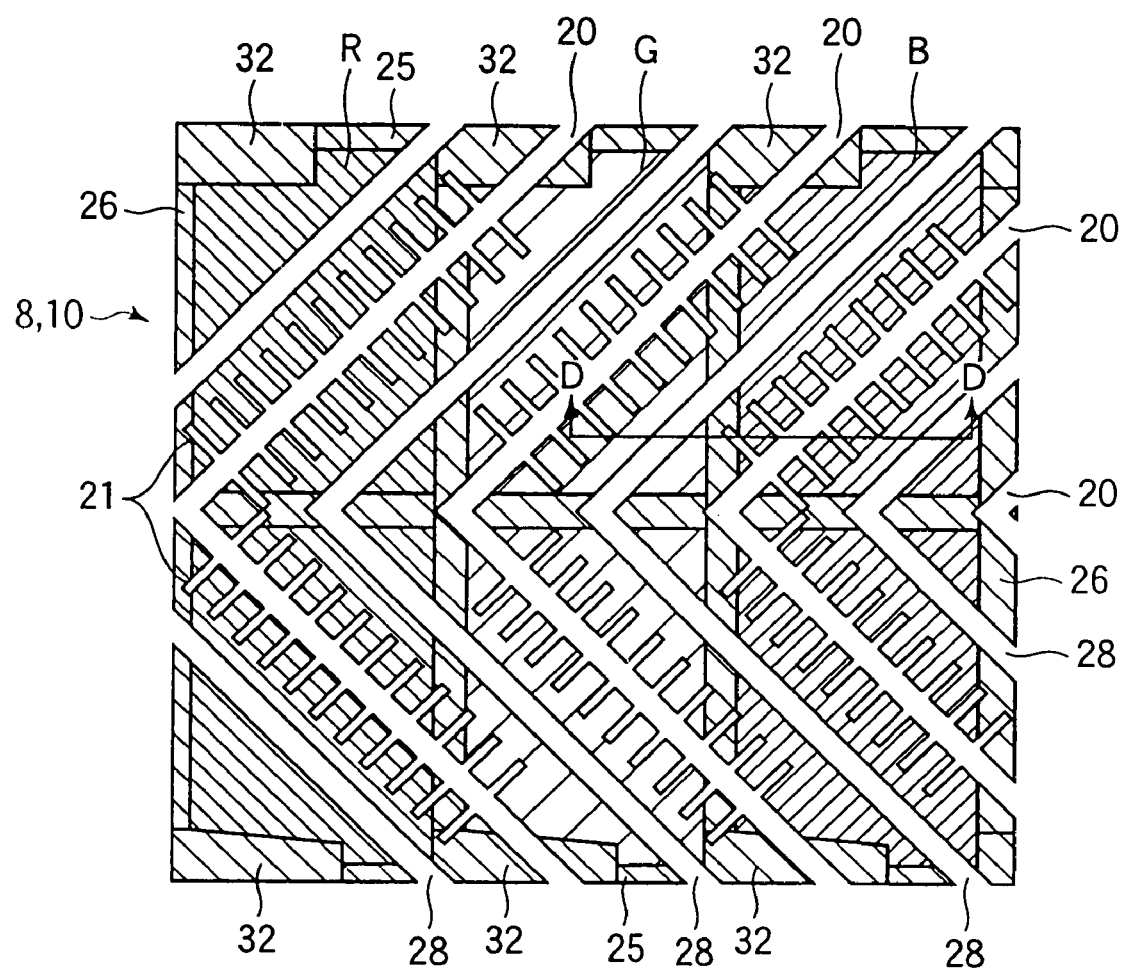
FIG. 7 shows a configuration of a liquid crystal display according to Embodiment 1-1 in the first mode for carrying out the invention.

A description will now be made with reference to FIGS. 7 through 16B on a substrate for a liquid crystal display according to Embodiment 1-1, a liquid crystal display having the same, and a method of manufacturing the same. FIG. 7 is a conceptual illustration showing a TFT substrate 8 and a common electrode substrate 10 which are combined, FIG. 7 showing three pixels in R, G and B. For example, the liquid crystal display of the present embodiment is an MVA type liquid crystal display, and FIG. 7 also shows the positions of alignment regulating structures. Linear protrusions 28 are formed on the common electrode substrate 10 at an angle to edges of the pixel regions. On the TFT substrate 8, slits 20 and finer slits 21 extending from the slits 20 substantially perpendicularly to the extending direction of the slits 20 are formed at an angle to the edges of the pixel regions. A plurality of finer slits 21 are formed at intervals smaller than the intervals between the slits 20 and linear protrusions 28. When alignment regulating structures are formed at relatively small intervals, liquid crystal molecules having negative dielectric anisotropy are aligned in parallel with the direction in which the alignment regulating structures extend. Therefore, the alignment of liquid crystal molecules is more strongly regulated by forming the finer slits 21 perpendicular to the slits 20.

Figure 8:
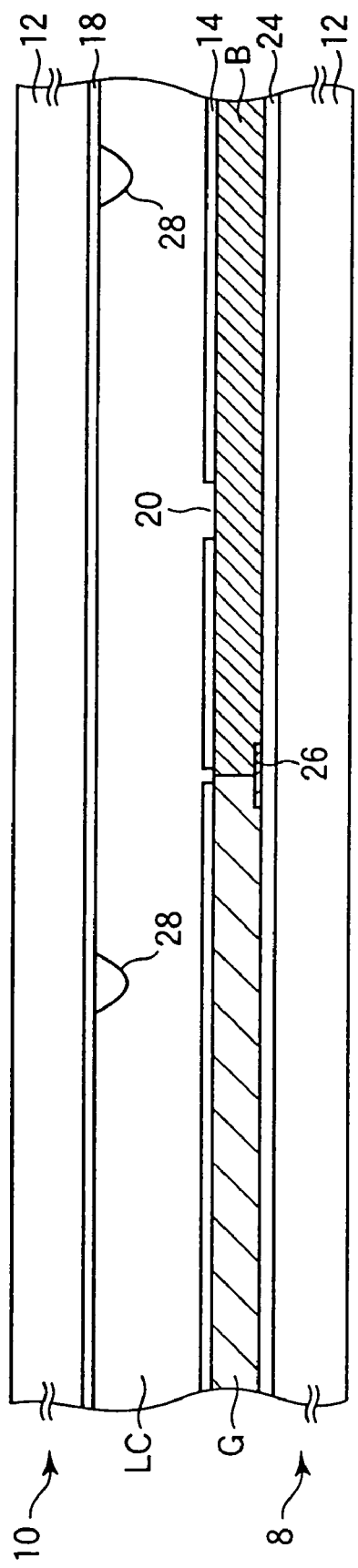
FIG. 8 is a sectional view showing a configuration of a substrate for a liquid crystal display according to Embodiment 1-1 in the first mode for carrying out the invention.

FIG. 8 shows a section of the liquid crystal display taken along the line D-D in FIG. 7. As shown in FIG. 8, the TFT substrate 8 has an insulation film 24 formed on an entire surface of a glass substrate 12. Drain bus lines 26 are formed on the insulation film 24. Resin CF layers R, G and B (FIG. 8 shows the layers G and B only) are formed on the drain bus lines 26. Pixel electrodes 14 and the slits 20 which are cuts-off in a part of the pixel electrodes 14 are formed on the resin CF layers R, G and B. FIG. 8 omits the finer slits 21. The common electrode substrate 10 has a common electrode 18 formed on an entire surface of a glass substrate 12. Linear protrusions 28 are formed on the common electrode 18. A vertical alignment film (not shown) is formed on the pixel electrodes 14, common electrode 18, and linear protrusions 28. A liquid crystal LC having negative dielectric anisotropy is sealed between the TFT substrate 8 and common electrode substrate 10.

Figure 9:
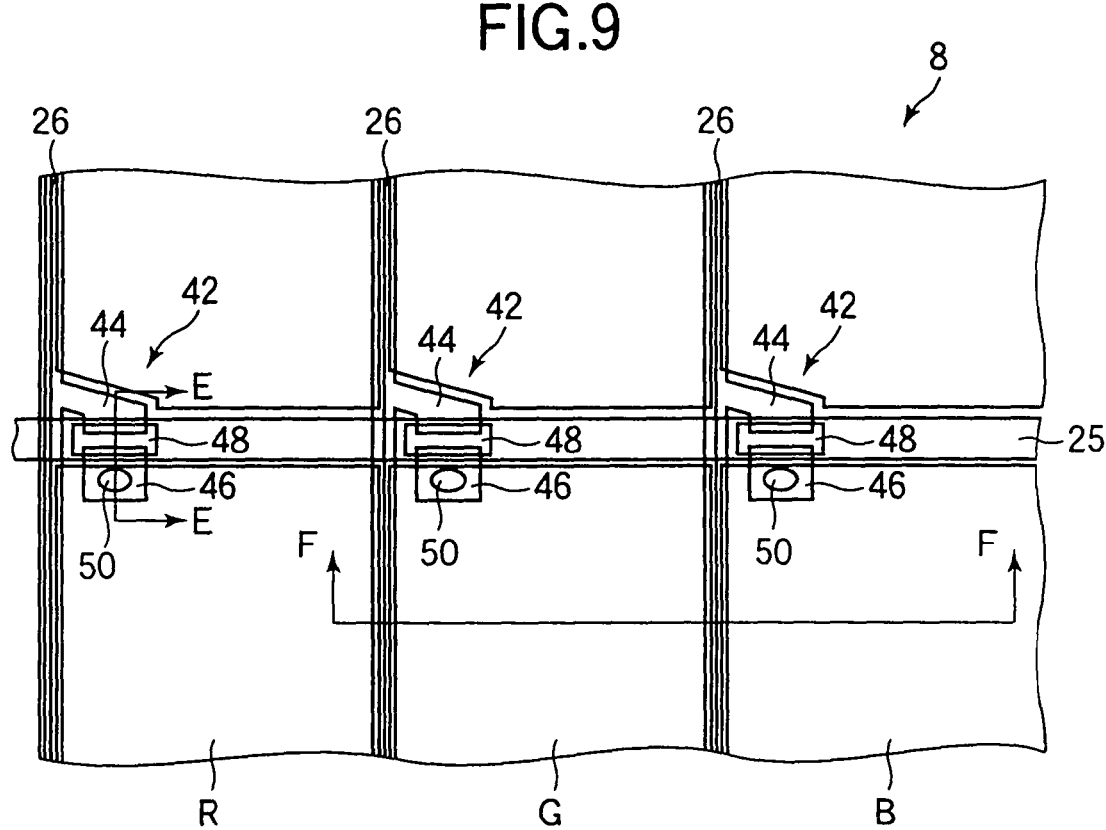
FIG. 9 shows a configuration of a substrate for a liquid crystal display according to Embodiment 1-1 in the first mode for carrying out the invention.

FIG. 9 shows a configuration in the vicinity of TFTs on the TFT substrate 8 of the present embodiment. As shown in FIG. 9, the TFT substrate 8 has a plurality of gate bus lines 25 (FIG. 9 shows only one of them) extending in the horizontal direction in the figure and the plurality of drain bus lines 26 (FIG. 9 shows three lines) extending in the vertical direction in the figure across the gate bus lines 25 on a glass substrate 12. TFTs 42 are formed in the vicinity of intersections between the bus lines 25 and 26. A TFT 42 is comprised of a drain electrode 44 that is a branch of a drain bus line 26, a source electrode 46 provided in a face-to-face relationship with the drain electrode 44 with a predetermined gap kept between them, and a part (gate electrode) of a gate bus line 25 which overlaps the drain electrode 44 and source electrode 46. An active semiconductor layer 52 is formed on the gate electrode, and a channel protection film 48 is formed on the same. The gate bus lines 25 and drain bus lines 26 define pixel regions, and resin CF layers R, G and B are formed in each of the pixel regions. A pixel electrode 14 is formed in each of the pixel regions. The pixel electrodes 14 are formed such that their edges in the horizontal direction in the figure overlap edges of the drain bus lines 26 when viewed in the direction perpendicular to the substrate surfaces. FIG. 9 omits slits.

Figures 10A, 10B:
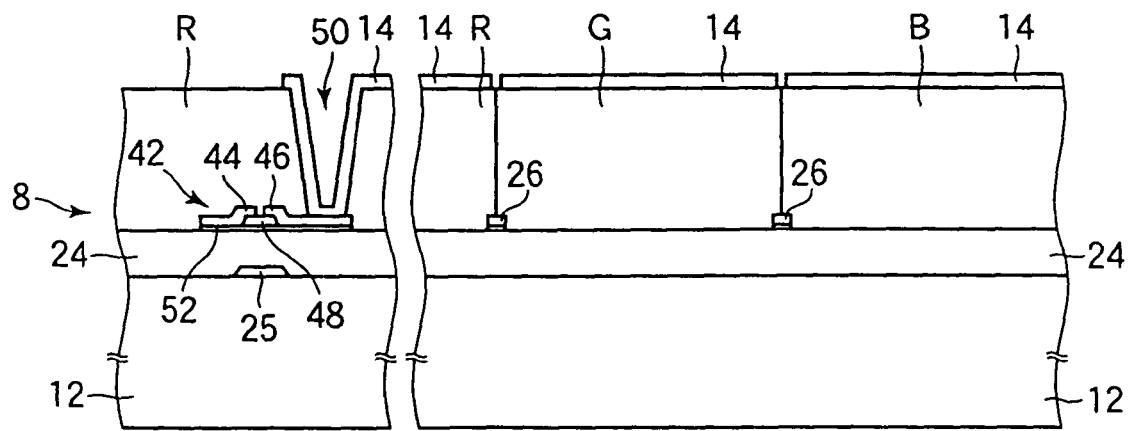
FIGS. 10A and 10B are sectional views showing the configuration of the substrate for a liquid crystal display according to Embodiment 1-1 in the first mode for carrying out the invention.

FIG. 10A shows a section of the TFT substrate 8 taken along the line E-E in FIG. 9, and FIG. 10B shows a section of the TFT substrate 8 taken along the line F-F in FIG. 9. As shown in FIGS. 10A and 10B, the resin CF layers, R, G and B are formed on the TFTs 42 and drain bus lines 26. The pixel electrodes 14 are formed on the resin CF layers R, G and B. The pixel electrodes 14 are formed such that their edges overlap the edges of the drain bus lines 26 when viewed in the direction perpendicular to the substrate surfaces.

A method of manufacturing the liquid crystal display of the present embodiment will now be described with reference to FIGS. 11A through 16B. FIGS. 11A through 16B are sectional views taken at manufacturing steps showing the method of manufacturing the liquid crystal display of the present embodiment. FIGS. 11A, 12A, 13A, 14A, 15A and 16A show the section of the TFT substrate 8 taken along the line E-E in FIG. 9, and FIGS. 11B, 12B, 13B, 14B, 15B and 16B show the section of the TFT substrate 8 taken along the line F-F in FIG. 9. For example, as shown in FIGS. 11A and 11B, an aluminum (Al) layer having a thickness of 100 nm and a titanium (Ti) layer having a thickness of 50 nm are formed in the same order on an entire surface of a glass substrate 12 and are patterned to form gate bus lines 25. The patterning is carried out using a photolithographic process in which a predetermined resist pattern is formed on the layers to be patterned; the layers to be patterned are etched using the resist pattern as an etching mask; and the resist pattern is then removed.

Next, for example, a silicon nitride film (SiN film) having a thickness of 350 nm, an a-Si layer 52' having a thickness of 30 nm, and a SiN film having a thickness of 120 nm are continuously formed as shown in FIGS. 12A and 12B. Then, a channel protection film 48 to serve as an etching stopper is formed on a self-alignment basis by patterning the same through backside exposure. For example, an n$^+$a-Si layer having a thickness of 30 nm, a Ti layer having a thickness of 20 nm, an aluminum layer having a thickness of 75 nm, and a Ti layer having a thickness of 40 nm are then formed as shown in FIGS. 13A and 13B and are patterned using the channel protection film 48 as an etching stopper to form drain electrodes 44, source electrodes 46, and drain bus lines 26. TFTs 42 are completed through the above-described steps.

Figures 14A, 14B:
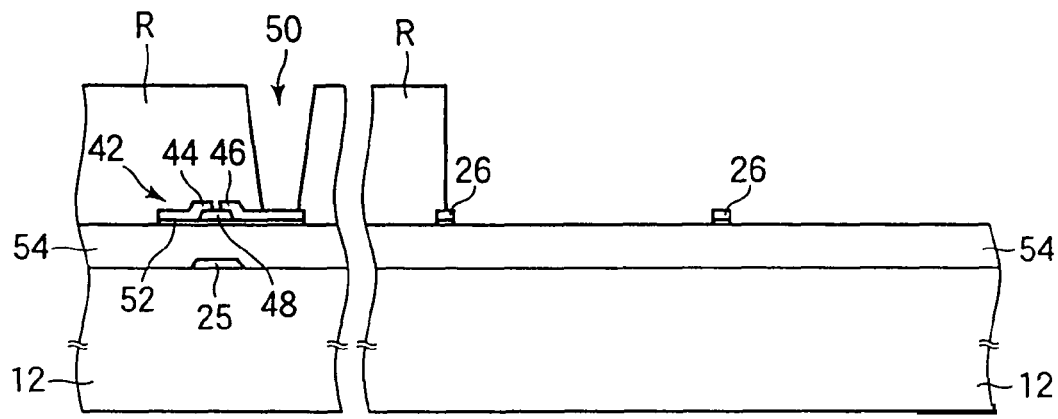
FIGS. 14A and 14B are sectional views taken at a manufacturing step showing the method of manufacturing the substrate for a liquid crystal display according to Embodiment 1-1 in the first mode for carrying out the invention.

Next, as shown in FIGS. 14A and 14B, for example, a red resist having a photosensitive pigment dispersed therein is applied to a thickness of 3.0 μm and patterned. Thereafter, post-baking is performed to form resin CF layers R in predetermined pixel regions, the layers having contact holes 50 formed above the source electrodes 46.

Figures 15A, 15B:
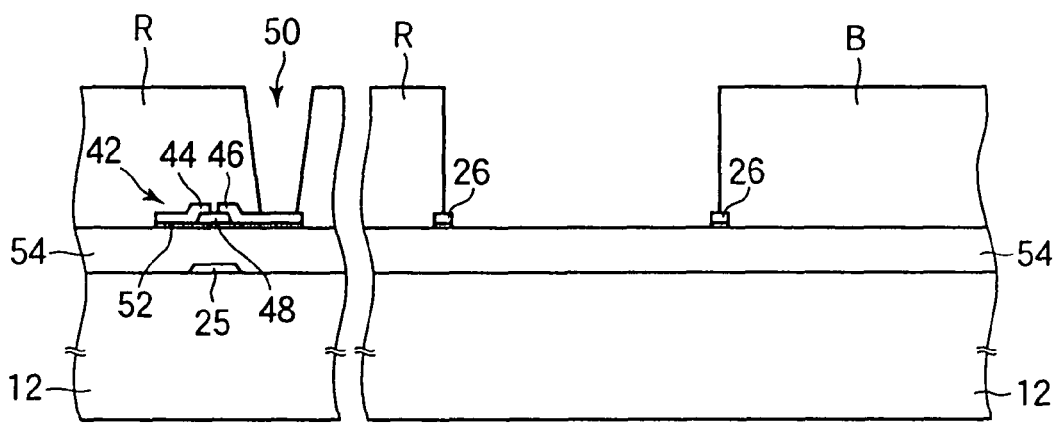
FIGS. 15A and 15B are sectional views taken at a manufacturing step showing the method of manufacturing the substrate for a liquid crystal display according to Embodiment 1-1 in the first mode for carrying out the invention.
Figures 16A, 16B:
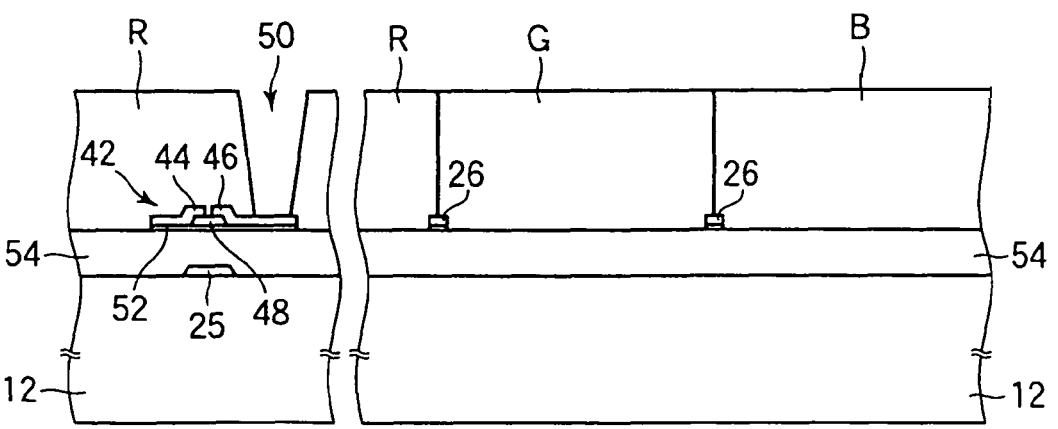
FIGS. 16A and 16B are sectional views taken at a manufacturing step showing the method of manufacturing the substrate for a liquid crystal display according to Embodiment 1-1 in the first mode for carrying out the invention.

Next, as shown in FIGS. 15A and 15B, for example, a blue resist having a photosensitive pigment dispersed therein is applied to a thickness of 3.0 μm and patterned. Thereafter, post-baking is performed to form resin CF layers B in predetermined pixel regions. Similarly, as shown in FIGS. 16A and 16B, resin CF layers G are formed in predetermined pixel regions. Next, an ITO film having a thickness of 70 nm for example is formed on the entire surface and patterned to form pixel electrodes 14 such that their edges in the horizontal direction in the figures overlap edges of the drain bus lines 26 when viewed in the direction perpendicular to the substrate surfaces. A TFT substrate 8 as shown in FIGS. 9 through 10B is completed through the above-described steps.

While the resin CF layers R, G and B are formed directly on source/drain forming layers such as the drain electrodes 44, source electrodes 46 and drain bus lines 26 in the present embodiment, a protective film may be formed on the source/drain forming layers and the resin CF layers R, G and B may be formed on the protective film. Alternatively, a protective film may be formed on the resin CF layers R, G and B, and the pixel electrodes 14 may be formed on the protective film. Obviously, the TFTs 42 and resin CF layers R, G and B may be formed and manufactured using materials and steps other than those described above.

Referring to alignment regulating structures, the slits 20 and finer slits 21 are formed on the TFT substrate 8, and the linear protrusions 28 are formed on the common electrode substrate 10 in the present embodiment. However, they may be used in different combinations. The present embodiment provides effects similar to those achieved with the above-described first basic configuration.

Embodiment 1-2

Figure 17:
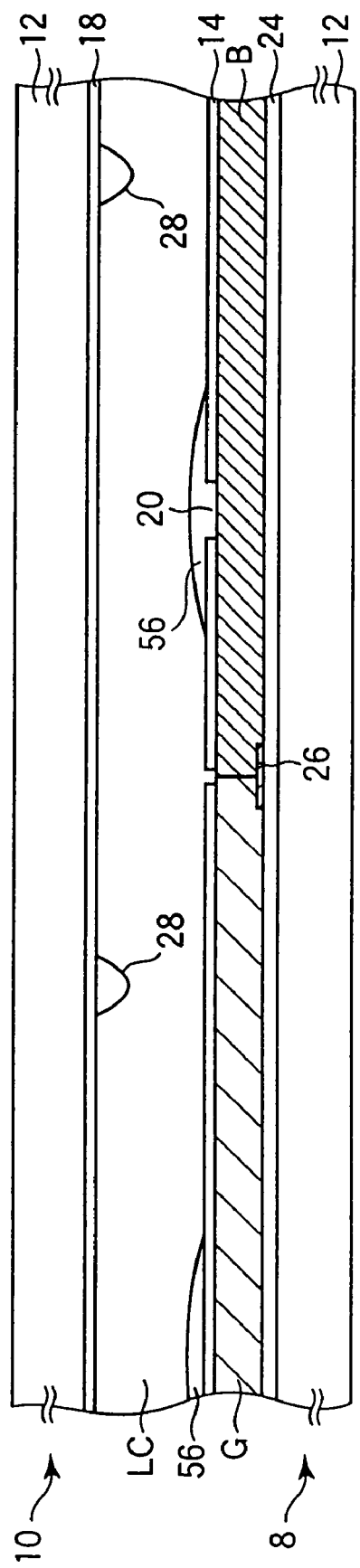
FIG. 17 is a sectional view showing a configuration of a liquid crystal display according to Embodiment 1-2 in the first mode for carrying out the invention.

A description will now be made with reference to FIGS. 17, 18 and 42 on a substrate for a liquid crystal display according to Embodiment 1-2 and a liquid crystal display having the same. FIG. 17 is a sectional view of the liquid crystal display of the present embodiment showing a configuration thereof, FIG. 17 showing a section similar to that shown in FIG. 8. As shown in FIG. 17, the liquid crystal display of the present embodiment has dielectric layers 56 which are formed above slits 20 in a TFT substrate 8 and which serve as alignment regulating structures for improving response characteristics of liquid crystal molecules to half tones. The dielectric layers 56 are formed from a photoresist or the like.

Figure 18:
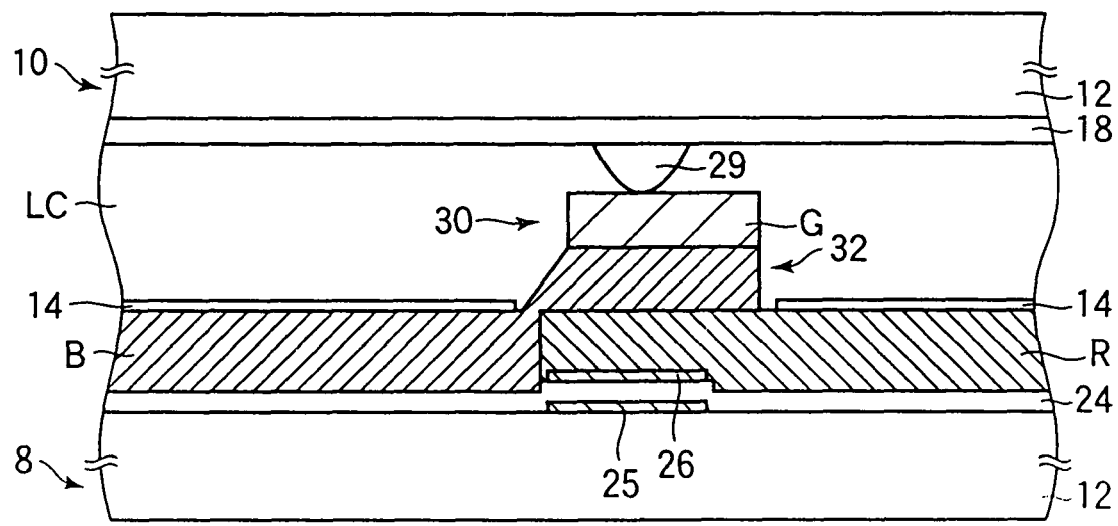
FIG. 18 is a sectional view showing the configuration of the liquid crystal display according to Embodiment 1-2 in the first mode for carrying out the invention.

FIG. 18 is a sectional view of the liquid crystal display of the present embodiment showing a configuration of the same, FIG. 18 showing a section similar to that shown in FIG. 4. As shown in FIG. 18, in the liquid crystal display of the present embodiment, resin CF layers R, B and G are formed in the same order in the vicinity of intersections between gate bus lines 25 and drain bus lines 26 on the TFT substrate 8. A protrusion 29 which does not function as an alignment regulating structure is formed on a common electrode 18 on a common electrode substrate 10. A columnar spacer 30 for maintaining a cell gap is formed by a gate bus line 25 on the TFT substrate 8, an insulation film 24, a drain bus line 26, resin CF layers R, G and B, and the protrusion 29 on the common electrode substrate 10.

The columnar spacer 30 is not limited to the above-described configuration and may be constituted by other layers. For example, it is possible to use a resin layer that is formed simultaneously with the dielectric layers 56 on the resin CF layer B from the same material as that of the layers 56. In this case, it is not necessary to form the protrusion 29 on the common electrode substrate 10. The TFTs 42, resin CF layers R, G and B, and so on may be formed and manufactured using materials and steps other than those described above. The alignment regulating structures respectively formed on the TFT substrate 8 and common electrode substrate 10 may be in other combinations. The present embodiment provides the same effects as those achieved with the above-described second basic configuration.

Figure 42:
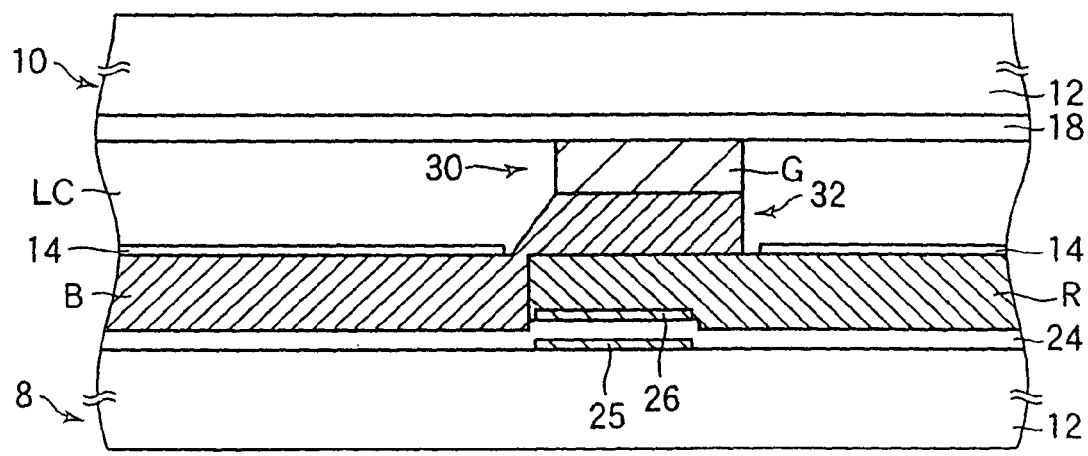
FIG. 42 is a sectional view showing a modification of the substrate for a liquid crystal display according to Embodiment 1-2 in the first mode for carrying out the invention.

FIG. 42 is a sectional view of the liquid crystal display of the present embodiment showing a modification of the same, and FIG. 42 shows a section similar to that shown in FIG. 4. As shown in FIG. 42, in the liquid crystal display of the present modification, a columnar spacer 30 is structured by only resin CF layers R, B and G laminated in the same order in the vicinity of intersections between gate bus lines 25 and drain bus lines 26 on the TFT substrate 8. Thus, the columnar spacer 30 may be formed using neither the protrusion 29 on the common electrode substrate 10 nor the dielectric layers 56 on the TFT substrate 8.

It is desirable for the CF-on-TFT structured MVA-LCD having another alignment regulation structure besides the protrusion 29 to use this structure. In the TN mode LCD, for example, it is necessary to consider the laminating accuracy at the time of laminating the resin CF layers, the panel attaching accuracy and the necessary area for obtaining the enough height of the layer while the columnar spacer is formed by laminating the resin CF layers. It is necessary to enlarge the sectional area of resin CF layers for forming the columnar spacer, therefore, the problem that the aperture ratio of pixel has to decrease is caused to the TN mode LCD.

On the other hand, there is no need to consider the panel attaching accuracy in the CF-on-TFT structure. However, the aperture ratio of pixel is decreased by forming the BM layer to shade the defective alignment of the liquid crystal in the vicinity of columnar spacer.

On the contrary, since the CF-on-TFT structured MVA-LCD has a normally black mode which always becomes black on the part of the display where the pixel electrode does not exist, there is no need to form BM layers. Therefore, it is possible to suppress the decreasing of aperture ratio of pixel. Moreover, since it is no need to consider the panel attaching accuracy and the defective alignment of the liquid-crystal in the vicinity of columnar spacer, it is possible to form the columnar spacer with suppressing the decreasing of aperture ratio of pixel.

Embodiment 1-3

Figure 19:
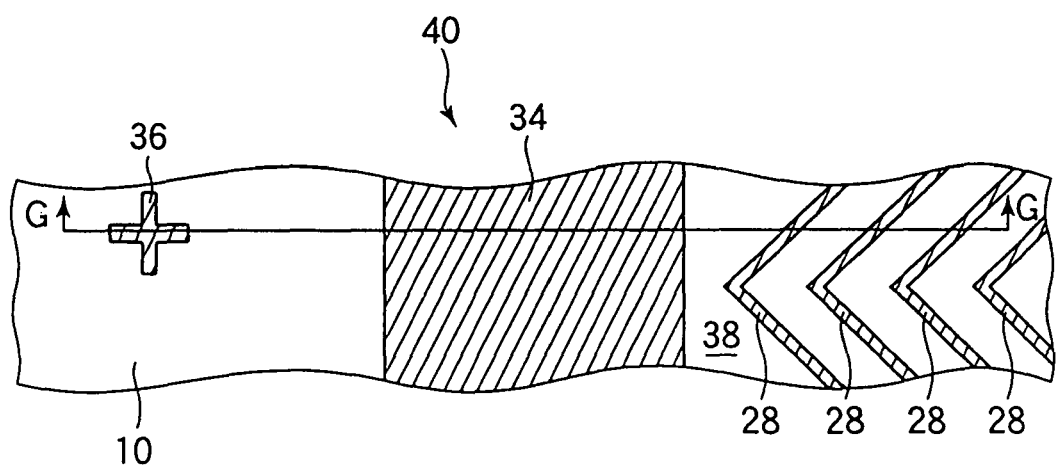
FIG. 19 shows a configuration of a substrate for a liquid crystal display according to Embodiment 1-3 in the first mode for carrying out the invention.
Figure 20:
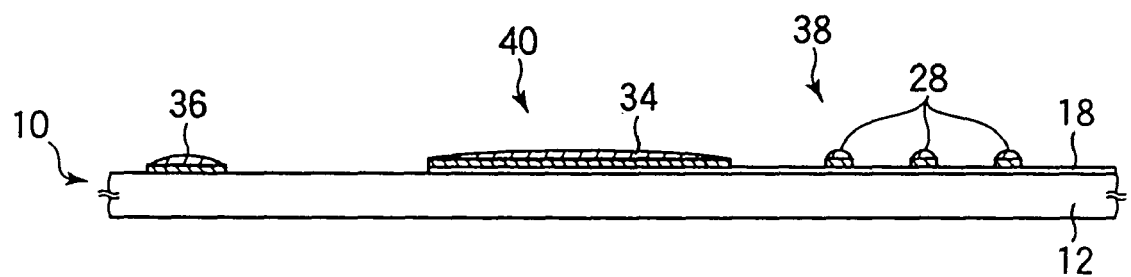
FIG. 20 is a sectional view showing the configuration of the substrate for a liquid crystal display according to Embodiment 1-3 in the first mode for carrying out the invention.

A description will now be made with reference to FIGS. 19 through 22 on a substrate for a liquid crystal display according to Embodiment 1-3, a liquid crystal display having the same, and a method of manufacturing the same. FIG. 19 shows a configuration of the substrate for a liquid crystal display of the present embodiment and corresponds to FIG. 6A. FIG. 20 shows a section of the substrate for a liquid crystal display taken along the line G-G in FIG. 19 and corresponds to FIG. 6B. As shown in FIGS. 19 and 20, a common electrode 18 is formed on a glass substrate 12 in a display area 38 and a frame region 40 on a common electrode substrate 10. Linear protrusions 28 are formed on the common electrode 18 in the display area 38 at an angle to edges of the display area 38. The linear protrusions 28 are formed by a bottom layer made of chromium (Cr) that is a light-blocking metal and a top layer which is a resist layer used for patterning Cr. A frame pattern 34 for shielding edges of the display area 38 from light is formed in the frame region 40. A cross-shaped alignment mark 36 used for combining the common electrode substrate with a TFT substrate 8 (which is not shown in FIGS. 19 and 20) in a face-to-face relationship is formed on the glass substrate 10 on the left side of the frame region 40 in the figure. The frame pattern 34 and alignment mark 36 are formed simultaneously with the linear protrusions 28 from the same material.

Figure 21:
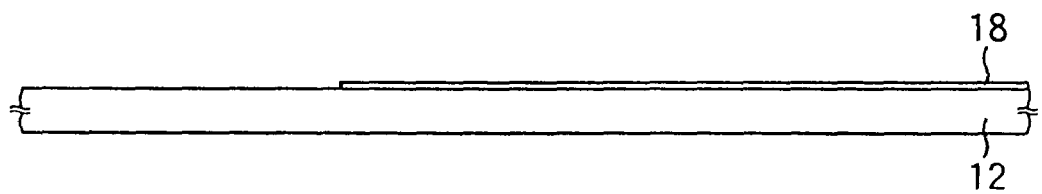
FIG. 21 is a sectional view taken at a manufacturing step showing a method of manufacturing the substrate for a liquid crystal display according to Embodiment 1-3 in the first mode for carrying out the invention.
Figure 22:
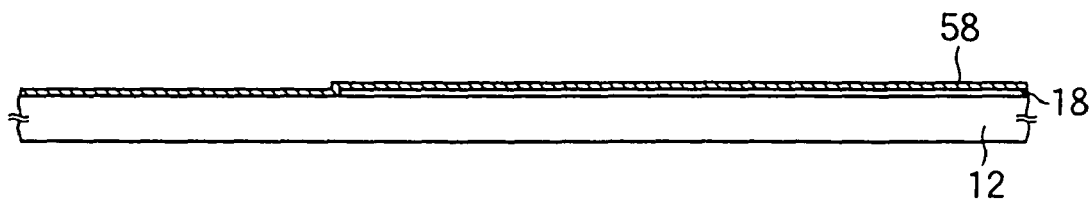
FIG. 22 is a sectional view taken at a manufacturing step showing the method of manufacturing the substrate for a liquid crystal display according to Embodiment 1-3 in the first mode for carrying out the invention.

A method of manufacturing the substrate for a liquid crystal display of the present embodiment will now be described with reference to FIGS. 21 and 22. For example, an ITO film having a thickness of 100 nm is first formed on an entire surface of the glass substrate 12 and patterned as shown in FIG. 21 to form the common electrode 18. For example, a Cr film having a thickness of 100 nm is then formed on the entire surface as shown in FIG. 22. Next, a resist is applied to the entire surface, exposed, and developed to form a predetermined resist pattern. Then, Cr is etched using the resist pattern as an etching mask to form the bottom layer of the linear protrusions 28, the frame pattern 34, and the alignment mark 36. The resist pattern is then hardened through post-baking to form the top layer of the linear protrusions 28. The common electrode substrate 10 of the present embodiment is completed through the above-described steps.

While a metal layer capable of blocking light such as Cr is used to shield the frame region 40 from light or to allow the alignment mark 36 to be visually recognized and a resist is used to form the linear protrusions 28 in the present embodiment, the need for a metal layer for blocking light can be eliminated by using a black resist for forming an opaque film as the resist layer as shown in FIGS. 5 through 6B. An MVA type liquid crystal display is in the normally black mode, and such a black resist will sufficiently work if it has an OD-value (optical density) on the order of 2.0.

As thus described, the present embodiment makes it possible to provide a liquid crystal display having high luminance and preferable display characteristics.

Second Mode for Carrying Out the Invention

A description will now be made with reference to FIGS. 23 and 24 on a substrate for a liquid crystal display on a second mode for carrying out the invention, a liquid crystal display having the same, and a method of manufacturing the same.

Color liquid crystal displays are used as monitors and displays of notebook PCs, PDAs (personal digital assistants), and the like, and there are recent demands for further reductions in the weight of such displays. In general, glass substrates occupy a great percentage of the weight of a liquid crystal display compared to other members. For example, glass substrates having a thickness of 0.7 mm occupy about 40% of the weight of a liquid crystal display. It is a common and effective approach to reduce the weight of glass substrates in order to reduce the weight of a liquid crystal display.

One means for reducing the weight of a glass is to reduce the thickness of the same. However, it is difficult to form TFTs and color filters on a thin glass through highly accurate patterning, and a problem arises in that there is a limit on patterning accuracy. When glass substrates having different characteristics are used as a TFT substrate and a common electrode substrate provided in a face-to-face relationship, a problem arises in that it is difficult to combine them together because of deformation of the substrates attributable to heat or the like. Although the two substrates may be polished to reduce the thicknesses of them after the liquid crystal panel is completed, a problem arises in that the manufacturing cost is increased.

Another method for reducing the weight of substrates is to use plastic substrates instead of glass substrates. However, this results in the same problem as encountered in the case of thin glass substrates in that it is difficult to form TFTs and color filters for which highly accurate patterning is required. Further, since such substrates are soft, a problem arises in that they may be insufficient in resistance to pressures applied by fingers and the like depending on the intended usage. It is an object of the present mode for carrying out the invention to provide a lightweight liquid crystal display having high reliability.

Taking those problems into consideration, in the present mode for carrying out the invention, TFTs and color filters are formed on one substrate. Since this eliminates the need for highly accurate patterning on another substrate, thin glass substrates, plastic substrates or the like may be freely chosen. Further, columnar spacers for maintaining a cell gap are formed on a substrate in advance in the present mode for carrying out the invention. This makes it possible to provide a stable cell gap and to improve anti-pressure properties.

A more specific description will be made on substrates for a liquid crystal display in the present mode for carrying out the invention, liquid crystal displays having the same, and methods of manufacturing the same with reference to Embodiments 2-1 and 2-2.

Embodiment 2-1

A liquid crystal display according to Embodiment 2-1 will now be described. A TFT substrate 8 of the liquid crystal display of the present embodiment has a configuration similar to that of the TFT substrate 8 in the first mode for carrying out the invention shown in FIGS. 9 through 10B.

Figure 23:
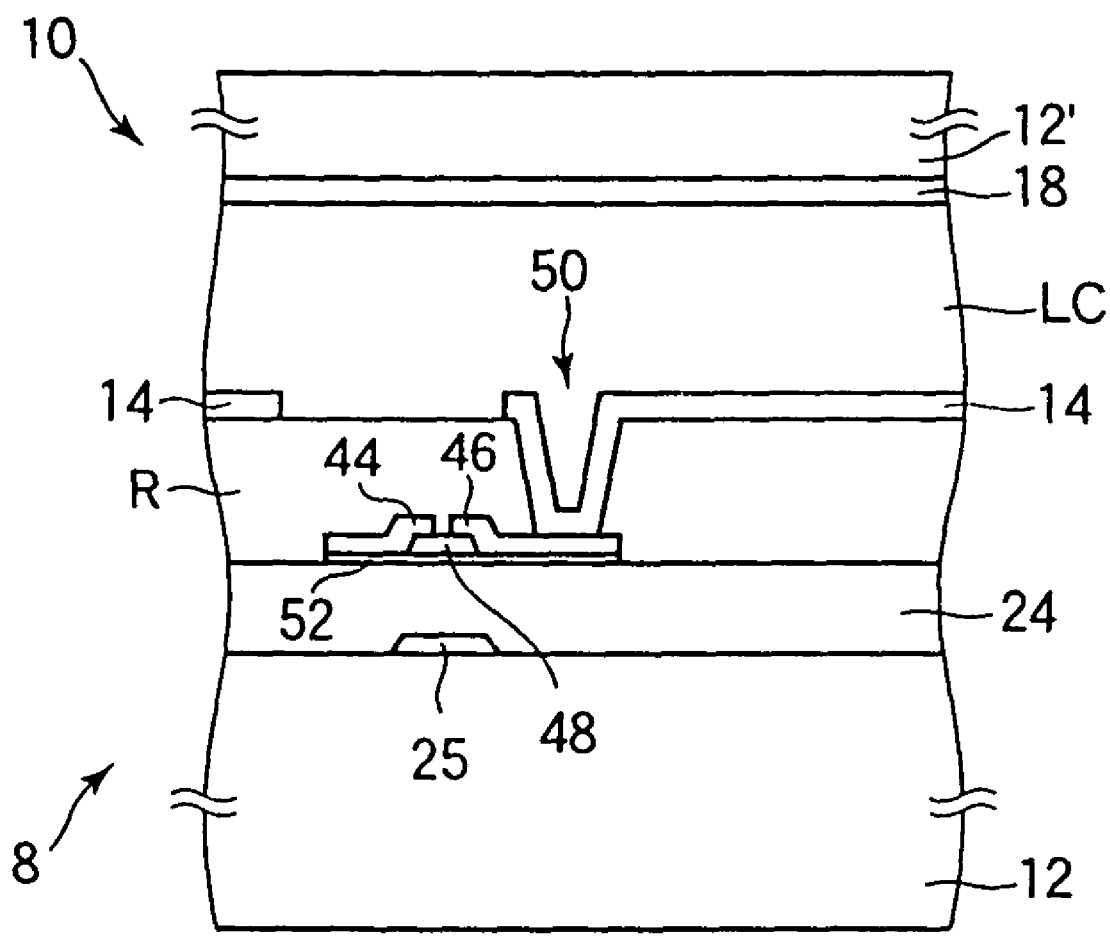
FIG. 23 shows a configuration of a substrate for a liquid crystal display according to Embodiment 2-1 in a second mode for carrying out the invention.
Figure 24:
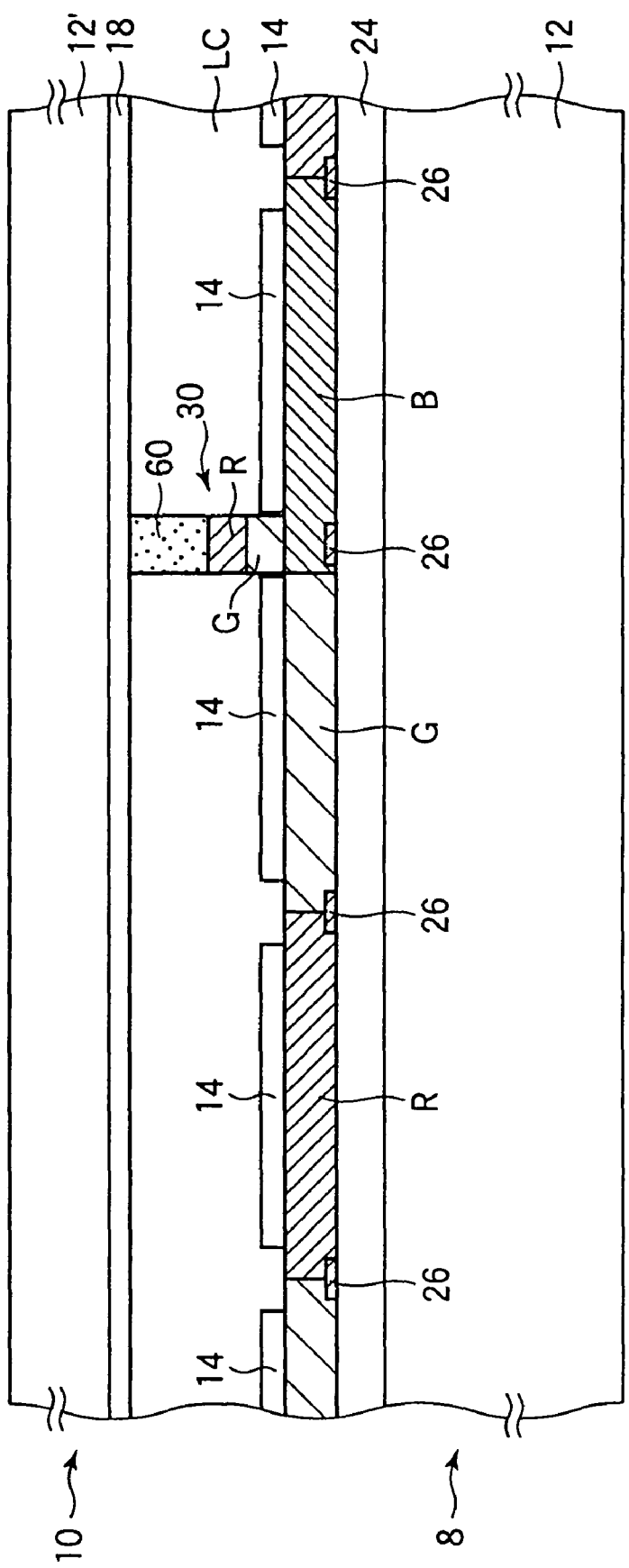
FIG. 24 is a sectional view taken at a manufacturing step showing a configuration of a liquid crystal display according to Embodiment 2-2 in the second mode for carrying out the invention.

FIG. 23 corresponds to FIG. 10A and shows a section of the liquid crystal display of the present embodiment. As shown in FIG. 23, the liquid crystal display of the present embodiment is formed by combining a TFT substrate 8 and a common electrode substrate 10 having a thickness smaller than that of the TFT substrate 8 with a predetermined cell gap kept between them. The common electrode substrate 10 has a common electrode 18 formed on a glass substrate 12' having a thickness smaller than that of a glass substrate 12 to serve as the TFT substrate 8.

A method of manufacturing a substrate for a liquid crystal display according to the present embodiment and a liquid crystal display having the same will now be briefly described. A method of manufacturing the TFT substrate 8 will not be described because it is similar to that in the first mode for carrying out the invention shown in FIGS. 11A through 16B. As shown in FIG. 23, a glass substrate 12' made of non alkali glass which is the same material as that of a glass substrate 12 to serve as the TFT substrate 8 and which has a thickness smaller than that of the glass substrate 12, e.g., 0.2 mm, is used as the common electrode substrate 10. For example, an ITO film having a thickness of 100 nm is formed on an entire surface of the glass substrate 12' and patterned to form a common electrode 18. This step completes the common electrode substrate 10.

Thereafter, alignment films are formed on surfaces of the substrates 8 and 10 in a face-to-face relationship and are rubbed. Next, a sealant is applied, and spacers are dispersed. The substrates 8 and 10 are then combined and cut into each panel. Next, a liquid crystal is injected through a liquid crystal injection port and sealed, and polarizers are applied. A liquid crystal display according to the present embodiment is completed through the above-described steps.

While non alkali glass having a thickness of 0.2 mm is used as the glass substrate 12' of the present embodiment, glass having a specific density different from that of the glass substrate 12 may be used instead. Soda lime glass including alkaline components may be used to achieve a greater reduction in the manufacturing cost. For example, the glass includes 1% or more alkaline components. However, when glass including alkaline components is used in a liquid crystal display having TFTs 42 of the channel-etching type or the like having exposed active semiconductor layers 52, since the TFTs 42 can be contaminated by alkali, the TFTs 42 are preferably protected with a protective film or the like. Such a problem will not occur when glass including alkaline components is used in a liquid crystal display having TFTs 42 with a channel protection film.

In the present embodiment, resin CF layers R, G and B are formed on the TFT substrate 8 to allow the use of a substrate made of glass or plastic as the common electrode substrate 10. This makes it possible to provide a lightweight and reliable liquid crystal display. Resistance to pressures applied by fingers and the like can be improved by providing a thicker substrate on the side of the display screen.

Embodiment 2-2

A liquid crystal display according to Embodiment 2-2 will now be described with reference to FIG. 24. FIG. 24 is a sectional view of the liquid crystal display of the present embodiment showing a configuration of the same. As shown in FIG. 24, a common electrode substrate 10 of the liquid crystal display of the present embodiment has a glass substrate 12' having a thickness smaller than that of a glass substrate 12 to serve as a TFT substrate 8 just as in the liquid crystal display of Embodiment 2-1.

Resin CF layers B, G and R are formed in the same order on the TFT substrate 8, and resin layers 60 made of photosensitive acrylic resin are formed on the same to form columnar spacers 30 for maintaining a cell gap. The layers of the columnar spacers 30 may be in other configurations, and the layers may be formed in any order. In the case of an MVA type liquid crystal display, the resin layers 60 may be formed simultaneously with linear protrusions as alignment regulating structures from the same material as that of the latter.

In the present embodiment, the use of the columnar spacers 30 prevent any variation of the cell gap attributable to spherical spacers or the like dispersed on a substrate surface which can be stranded on alignment regulating structures, and this makes it possible to provide a stable cell gap. Further, since the columnar spacers 30 are provided on the substrate surface uniformly and in a high density, anti-pressure properties are improved. For this reason, a reliable liquid crystal display can be provided even when the common electrode substrate 10 is provided on the display screen side. When the TFT substrate 8 is provided on the display screen side, since reflection is increased by the metal layer, it is desirable to use a low-reflection multi-layer metal at least on the side of the metal layer facing the glass substrate 12.

Effects of the present mode for carrying out the invention will now be specifically described in comparison to those of a conventional liquid crystal display. Table 1 specifies two substrates A1 and B1 that form a part of a conventional liquid crystal display. Resin CF layers R, G and B are formed on the substrate A1, and TFTs 42 are formed on the substrate B1. The substrates A1 and B1 are made of NA35 glass. The substrates A1 and B1 have a thickness of 0.7 mm and a density of 2.50 g/cm$^3$.

TABLE 1

|  | Material | Thickness (mm) | Density (g/cm$^3$) | Components on Substrates | Panel Weight Percentage |
| --- | --- | --- | --- | --- | --- |
| Substrate A1 | NA35 glass | 0.7 | 2.50 | CF | 1 |
| Substrate B1 | NA35 glass | 0.7 | 2.50 | TFT |  |

Table 2 specifies two substrates A2 and B2 that form a part of another conventional liquid crystal display. NA35 glass having a density of 2.50 g/cm$^3$ is used for both of the substrates A2 and B2 similarly to the substrates A1 and B1. After they are combined, each of the substrates A2 and B2 is polished to a thickness of 0.5 mm. Resin CF layers R, G and B are formed on the substrate A2, and TFTs 42 are formed on the substrate B2. Although a reduction in weight has been achieved in the resultant panel in that it has a weight percentage of 0.71 (hereinafter referred to as "panel weight percentages") where it is assumed that a liquid crystal panel obtained by combining the substrates A1 and B1 shown in Table 1 has a weight percentage of 1, the panel is more expensive because of an increase in the manufacturing cost.

TABLE 2

|  | Material | Thickness (mm) | Density (g/cm$^3$) | Components on Substrates | Panel Weight Percentage |
| --- | --- | --- | --- | --- | --- |
| Substrate A2 | NA35 glass | 0.5 | 2.50 | CF | 0.71 |
| Substrate B2 | NA35 glass | 0.5 | 2.50 | TFT |  |

Table 3 specifies two substrates A3 and B3 that form a part of a liquid crystal display according to the present embodiment. NA35 glass having a thickness of 0.7 mm and a density of 2.50 g/cm$^3$ is used for the substrate B3 similarly to the substrate B1. TFTs 42 and resin CF layers R, G and B are formed on the substrate B3. Asahi AS glass that is alkali glass having a thickness of 0.2 mm and a density of 2.49 g/cm$^3$ is used for the substrate A3. The resultant panel has a weight percentage of 0.64 which represents a weight smaller than that of the panel shown in Table 2. The substrate A3 may be made of any type of glass that is lighter than the substrate B3.

TABLE 3

|  | Material | Thickness (mm) | Density (g/cm$^3$) | Components on Substrates | Panel Weight Percentage |
| --- | --- | --- | --- | --- | --- |
| Substrate A3 | Asahi AS | 0.2 | 2.49 | — | 0.64 |
| Substrate B3 | NA35 glass | 0.7 | 2.50 | TFT CF |  |

Table 4 specifies two substrates A4 and B4 that form a part of another liquid crystal display according to the present embodiment. NA35 glass having a thickness of 0.7 mm and a density of 2.50 g/cm³ is used for the substrate B4 similarly to the substrate B1. TFTs and color filters are formed on the substrate B4. Polyethersulfone (PES) having a thickness of 0.2 mm and a density of 1.40 g/cm³ is used for the substrate A4. The resultant panel has a weight percentage of 0.58 which represents a greater reduction in weight than that of the panel shown in Table 3. The material of the substrate A4 is not limited to PES and may be any plastic such as polycarbonate (PC) or polyacrylate (PAR).

TABLE 4

| | Material | Thickness (mm) | Density (g/cm³) | Components on Substrates | Panel Weight Percentage |
|---|---|---|---|---|---|
| Substrate A4 | PES | 0.2 | 1.40 | — | 0.58 |
| Substrate B4 | NA35 glass | 0.7 | 2.50 | TFT CF | |

As described above, the resin CF layers R, B and G are formed under the pixel electrodes 14 in the present mode for carrying out the invention. This eliminates any need for highly accurate patterning of the common electrode substrate 10 and also eliminates any need for accurate alignment when combining it with the TFT substrate 8. Since this makes it possible to use a glass substrate, plastic substrate, or the like having a small thickness as the common electrode substrate 10, a lightweight and reliable liquid crystal display can be provided. Further, since there is no need for polishing the TFT substrate 8 and common electrode substrate 10 to reduce their thickness after combining them, there is no increase in manufacturing steps and manufacturing cost.

Third Mode for Carrying Out the Invention

A description will now be made with reference to FIGS. 25 through 34B on a substrate for a liquid crystal display, a liquid crystal display having the same, and a method of manufacturing the same.

In the case of a substrate for a liquid crystal display having a structure in which resin CF layers R, G and B are formed on a TFT substrate 8 (CF-on-TFT structure) as in the first mode for carrying out the invention, the numerical aperture can be improved because the resin CF layers R, G and B are formed under pixel electrodes 14. This improves the transmittance of the panel and makes it possible to improve the luminance of the liquid crystal display.

However, in a substrate for a liquid crystal display having the CF-on-TFT structure as in the first mode for carrying out the invention, if the top of the source/drain metal layers which are the top layer (A gate metal layer may be also included in the top layer in the case of a top gate structure. Hereinafter, such a configuration will be also simply referred to as "source/drain metal layers".) is not covered by a protective film (passivation film) when the TFTs 42 are formed, the source/drain metal layers can be corroded by a CF developer when the resin CF layers R, G and B formed above the same are patterned, which results in a problem in that the resistance of the bus lines constituted by the metal layers is increased and in that the bus lines are broken. Another problem arises in that the source electrodes 44 and drain electrodes 46 are removed as a result of corrosion to expose the active semiconductor layer 52 which can then be contaminated as a result of contact with the CF developer. When a protective film is formed on the source/drain metal layer using a CVD apparatus, another problem arises in that there will be an increase in the number of manufacturing steps. It is an object of the present mode for carrying out the invention to provide a substrate for a liquid crystal display with which an inexpensive and reliable display can be provided, a liquid crystal display having the same, and a method of manufacturing the same.

In the present mode for carrying out the invention, the above-mentioned problems are solved by covering source/drain metal layers with resin CF layers R, G and B which are first formed or black matrix resin formed under the resin CF layers R, G and B or resin that formed a part of columnar spacers 30.

A more specific description will now be made with reference to Embodiment 3-1 and Embodiment 3-2 on substrates for a liquid crystal display in the present invention, liquid crystal displays having the same, and methods of manufacturing the same.

Embodiment 3-1

Figure 25:
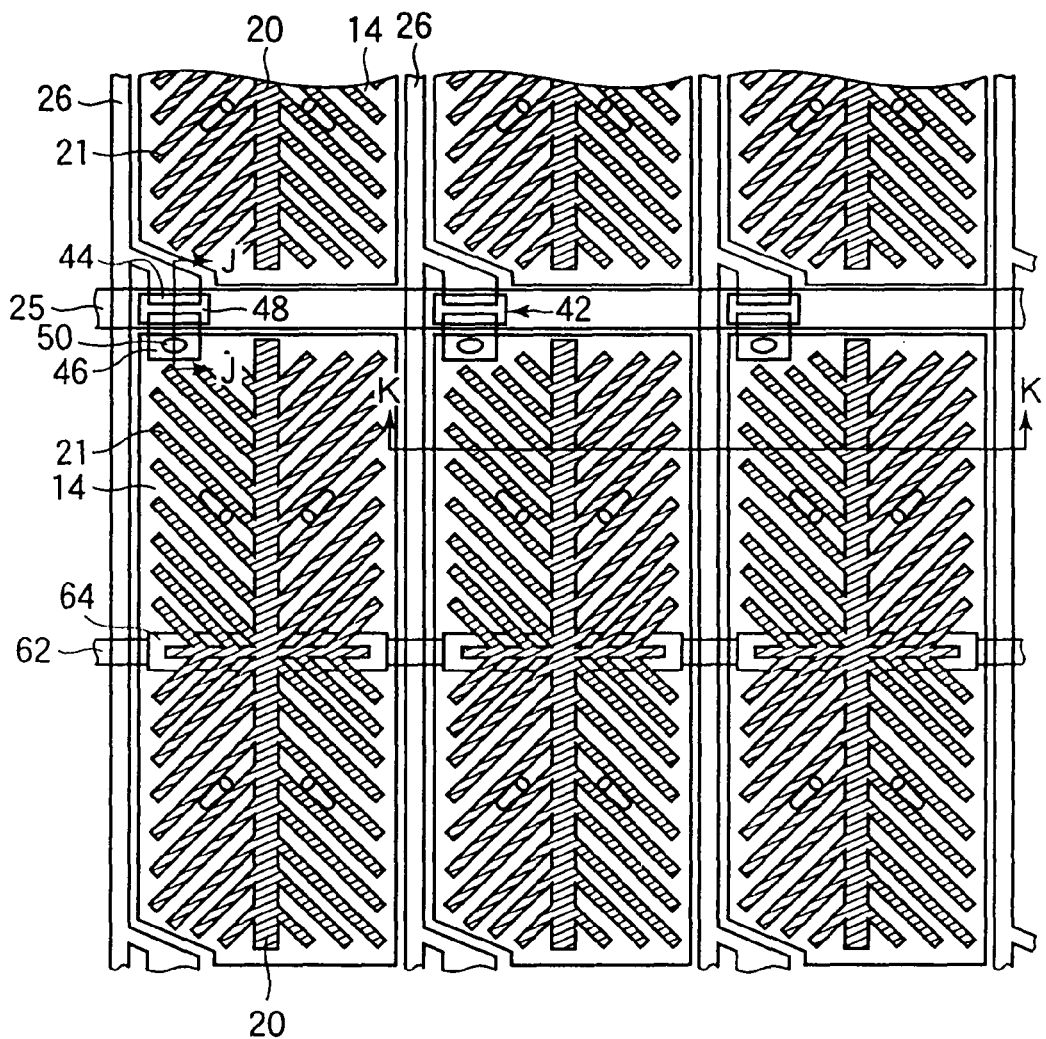
FIG. 25 shows a configuration of a liquid crystal display according to Embodiment 3-1 in a third mode for carrying out the invention.

A description will be first made on a substrate for a liquid crystal display according to Embodiment 3-1, a liquid crystal display having the same, and a method of manufacturing the same with reference to FIGS. 25 through 33B. FIG. 25 shows a configuration of the substrate for a liquid crystal display according to the present embodiment (CF layers are omitted in the figure). FIG. 26A shows a section of the substrate for a liquid crystal display taken along the line J-J in FIG. 25, and FIG. 26B shows a section of the substrate for a liquid crystal display taken along the line K-K in FIG. 25. As shown in FIGS. 26A and 26B, in the substrate for a liquid crystal display, a black matrix is formed by forming two resin CF layers in different colors at edges of pixel regions. Throughout the black matrix formed by overlapping two resin CF layers, a resin CF layer R is located at the bottom thereof. The resin CF layers R are formed such that they cover all of source/drain metal layers such as drain bus lines 26. A pixel electrode 14 is formed with a slit 20 extending in parallel with an edge of the pixel region and a plurality of finer slits 21 diagonally extending from the slit 20. The substrate for a liquid crystal display of the present embodiment has a liquid crystal in which a polymeric structure is formed by curing ultraviolet monomers through irradiation with ultraviolet light.

A method of manufacturing the substrate for a display of the present embodiment will now be described with reference to FIGS. 27 through 33B. FIGS. 27 through 30 illustrate a method of manufacturing the substrate for a liquid crystal display of the present embodiment. FIGS. 31A through 33B are sectional views at manufacturing steps illustrating the method of manufacturing the substrate for a liquid crystal display of the present embodiment. FIGS. 31A, 32A and 33A show a section similar to that in FIG. 26A, and FIGS. 31B, 32B and 33B show a section similar to that in FIG. 26B. Steps up to the formation of TFTs 42 and drain bus lines 26 on a glass substrate 12 will not be described because they are similar to those in the method of manufacturing the substrate for a liquid crystal display of Embodiment 1-1 shown in FIGS. 11A through 13B.

Figure 27:
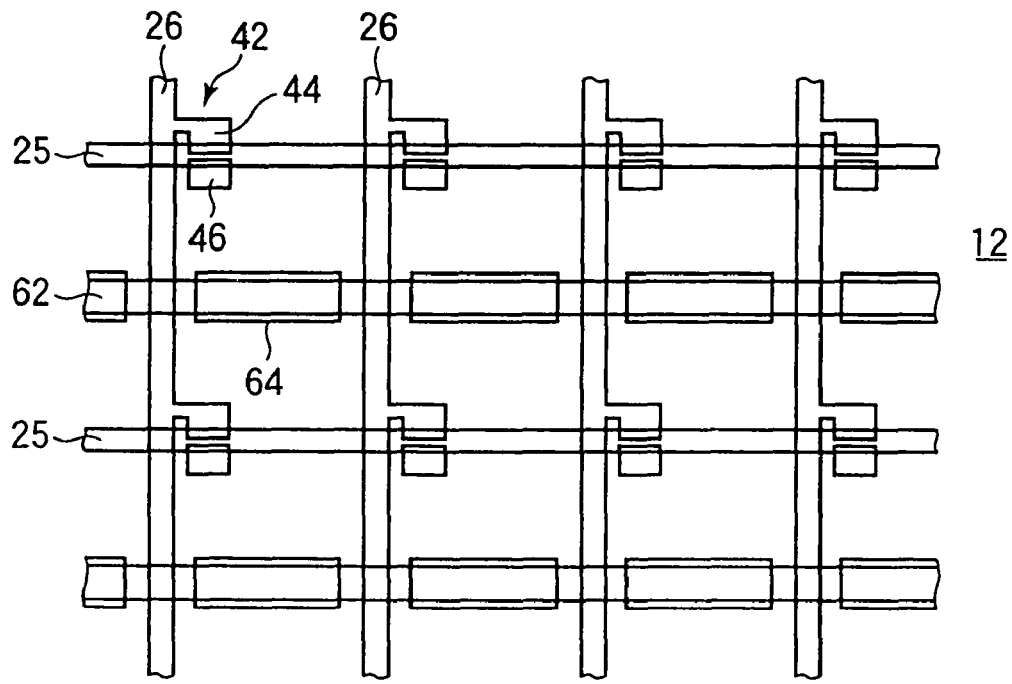
FIG. 27 shows a method of manufacturing the liquid crystal display according to Embodiment 3-1 in the third mode for carrying out the invention.

At steps as shown in FIGS. 11A through 13B, a plurality of gate bus lines 25 extending in the horizontal direction in the figures and drain bus lines 26 extending in the vertical direction in the figures across the gate bus lines 25 are formed (see FIG. 27). TFTs 42 are formed in the vicinity of intersections between the gate bus lines 25 and drain bus lines 26. The gate bus lines 25 and drain bus lines 26 define pixel regions. Storage capacity bus lines (auxiliary capacity electrodes) 62 extending through the pixel regions substantially in the middle thereof and substantially in parallel with the gate bus lines 25 are formed in the same layer as that of the gate bus lines 25. A storage capacity electrode (intermediate electrode) 64 for each pixel region is formed on the storage capacity bus line 62 in the same layer as that of the drain bus lines 26.

Figure 28:
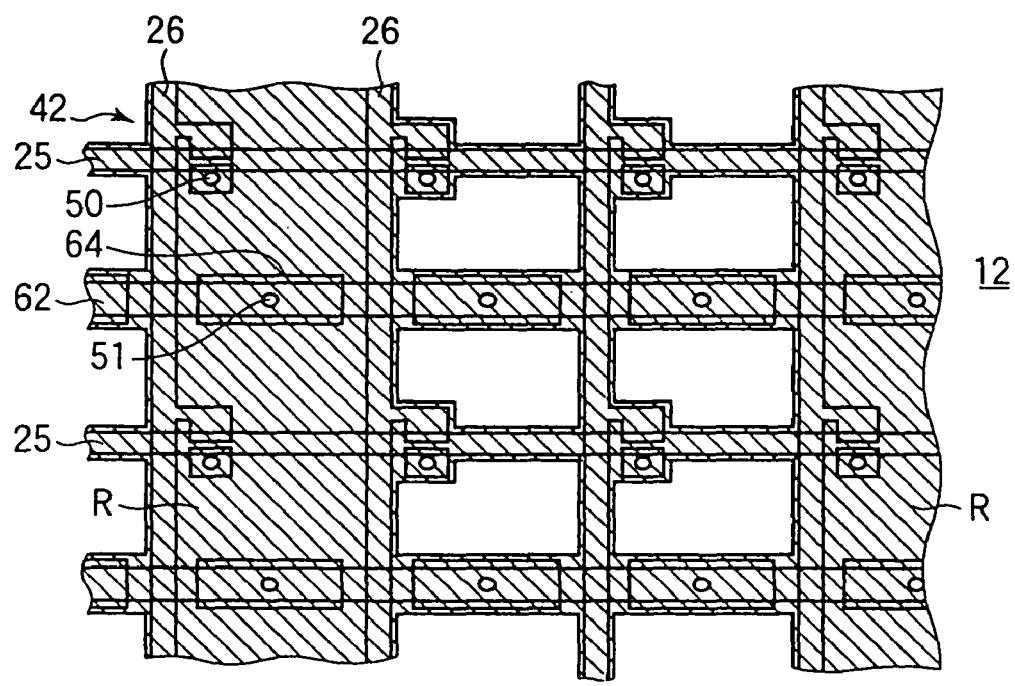
FIG. 28 shows the method of manufacturing the liquid crystal display according to Embodiment 3-1 in the third mode for carrying out the invention.

Next, a photosensitive red resist having a pigment dispersed therein is applied to a thickness of 1.5 μm for example and patterned. It is thereafter subjected to post-baking to form first resin CF layers R on pixel regions to display red, the TFTs 42, the gate bus lines 25, the drain bus lines 26 and the storage capacity bus lines 62 as shown in FIGS. 28, 31A and 31B. At this time, the drain electrodes 44, source electrodes 46 and drain bus lines 26 that are top metal layers are covered by the resin CF layers R.

Figure 29:
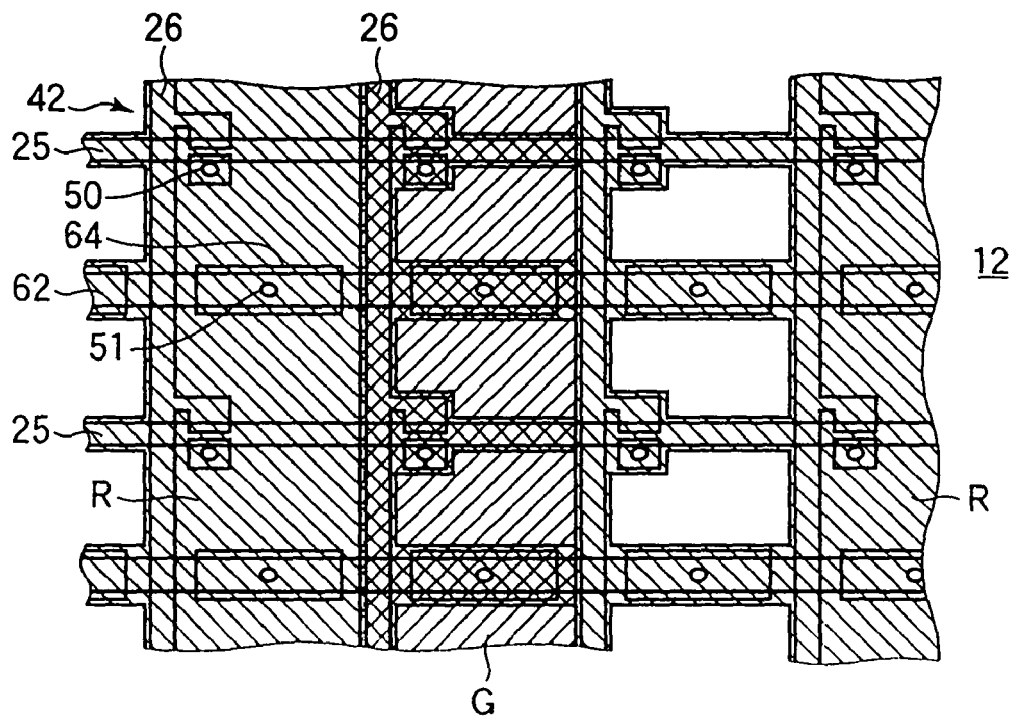
FIG. 29 shows the method of manufacturing the liquid crystal display according to Embodiment 3-1 in the third mode for carrying out the invention.

Next, a green resist is applied to a thickness of 1.5 μm for example and patterned. It is thereafter subjected to post-baking to form second resin CF layers G on pixel regions to display green and on the drain bus lines 26 located adjacently to such pixel regions on the left of the same, as shown in FIGS. 29, 32A and 32B. At this time, a black matrix is formed by overlapping two resin CF layers on the TFTs 42 in the pixel regions, the gate bus lines 25 adjacent to the pixel regions, the storage capacity bus lines 62 in the pixel regions, and the drain bus lines 26 located adjacently to the pixel regions on the left of the same.

Figure 30:
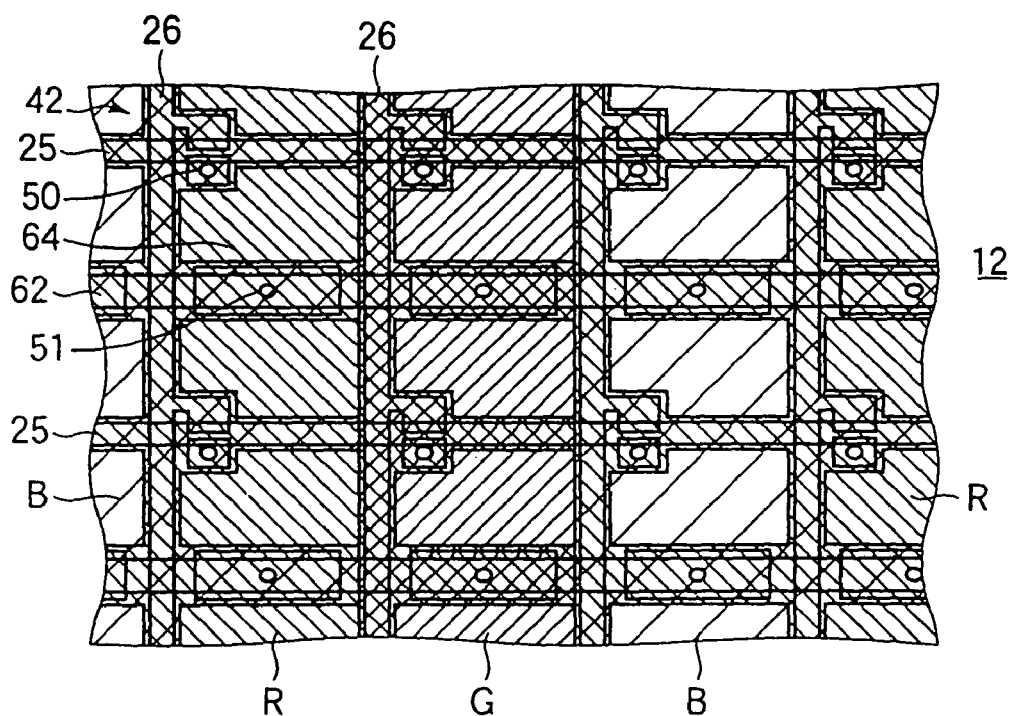
FIG. 30 shows the method of manufacturing the liquid crystal display according to Embodiment 3-1 in the third mode for carrying out the invention.

Next, a blue resist is applied to a thickness of 1.5 μm for example and patterned. It is thereafter subjected to post baking to form third resin CF layers B on pixel regions to display blue, the drain bus lines 26 located adjacently to such pixel regions on both sides of the same, and the TFTs 42 located adjacently to the pixel regions on the right of the same, as shown in FIGS. 30, 33A and 33B. At this time, a black matrix is formed by overlapping two resin CF layers on the TFTs 42 in the pixel regions located adjacently to the pixel regions on the right of the same, the gate bus lines 25 adjacent to the pixel regions, the storage capacity bus lines 62 in the pixel regions, and the drain bus lines 26 located adjacently to the pixel regions on both sides of the same.

Figures 26A, 26B:
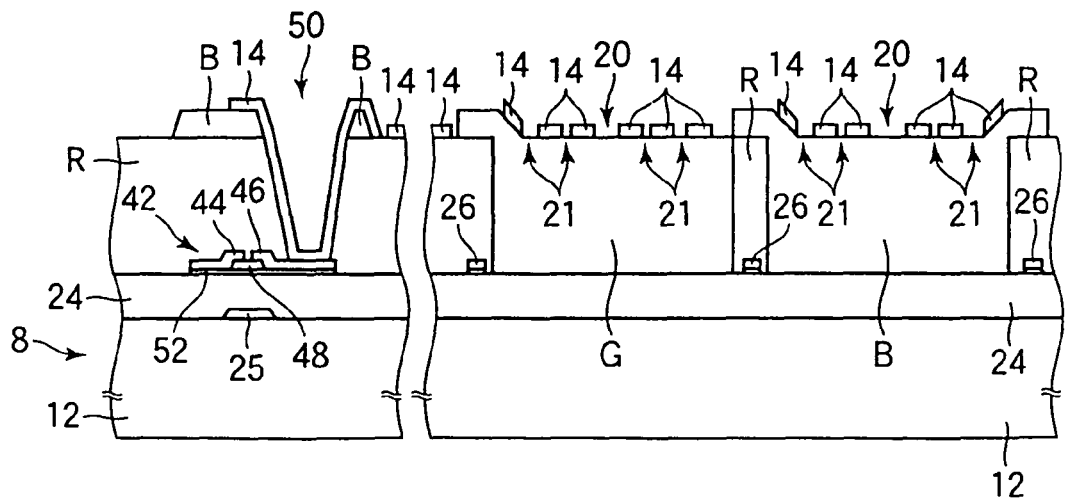
FIGS. 26A and 26B are sectional views showing the configuration of the liquid crystal display according to Embodiment 3-1 in the third mode for carrying out the invention.

Thereafter, an ITO film having a thickness of 70 nm for example is formed on the entire surface and patterned to form a pixel electrode 14, a slit 20 and finer slits 21 in each pixel region, which completes a substrate for a liquid crystal display as shown in FIGS. 25 through 26B.

Next, a vertical alignment film is applied to each of surfaces of a common electrode substrate formed with a common electrode made of ITO for example and the above-described substrate for a liquid crystal display, the surfaces facing each other. For example, spherical spacers are then dispersed on one of the substrates, and a sealant is applied to the periphery of the other substrate. Subsequently, the two substrates are put together, and a liquid crystal is injected into a gap between the substrates. Referring to the liquid crystal, for example, a negative liquid crystal having negative dielectric anisotropy added with 0.2% ultraviolet-curing monomer by weight may be used. Next, for example, a tone voltage of 10 V dc is applied to the drain bus lines 26, and a common voltage of 5 V dc is applied to the common electrode. Subsequently, for example, a gate voltage of 30 V dc is applied to the gate bus lines 25 to tilt the liquid crystal in the liquid crystal panel which is then irradiated with ultraviolet light of 2000 mJ having a wavelength in the range from 300 to 450 nm from the opposite substrate side. As a result, the ultraviolet-curing monomers are cured to form a polymeric structure in the liquid crystal in the liquid crystal panel, which causes the liquid crystal molecules (represented by columns in the drawings) to be tilted in four directions from their states when no voltage is applied, as shown in FIG. 25. In the present embodiment, the pre-tilt angle of the liquid crystal molecules is 86 deg. Thereafter, polarizers are applied to the two substrates to complete the liquid crystal display of the present embodiment.

Embodiment 3-2

Figures 34A, 34B:
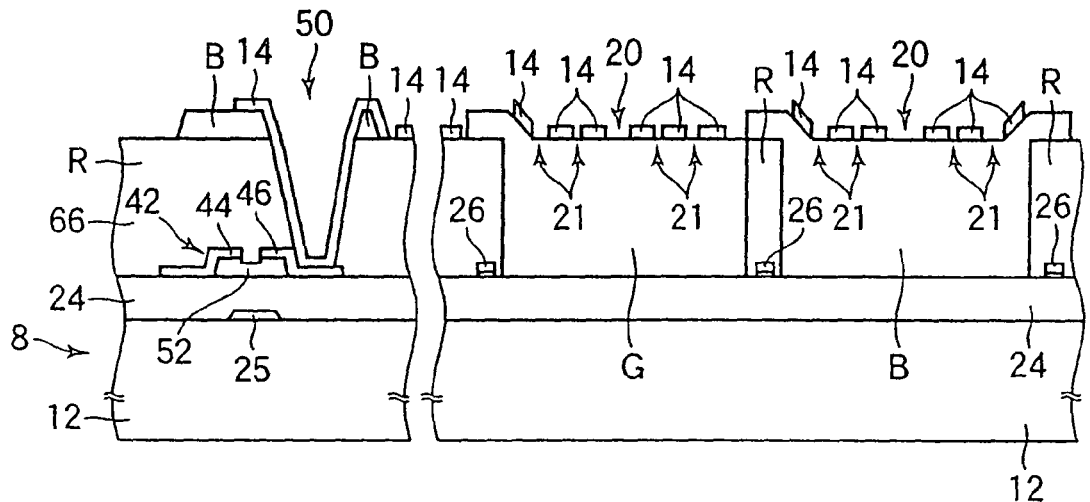
FIGS. 34A and 34B are sectional views showing a configuration of a liquid crystal display according to Embodiment 3-2 in the third mode for carrying out the invention.
Figure 35:
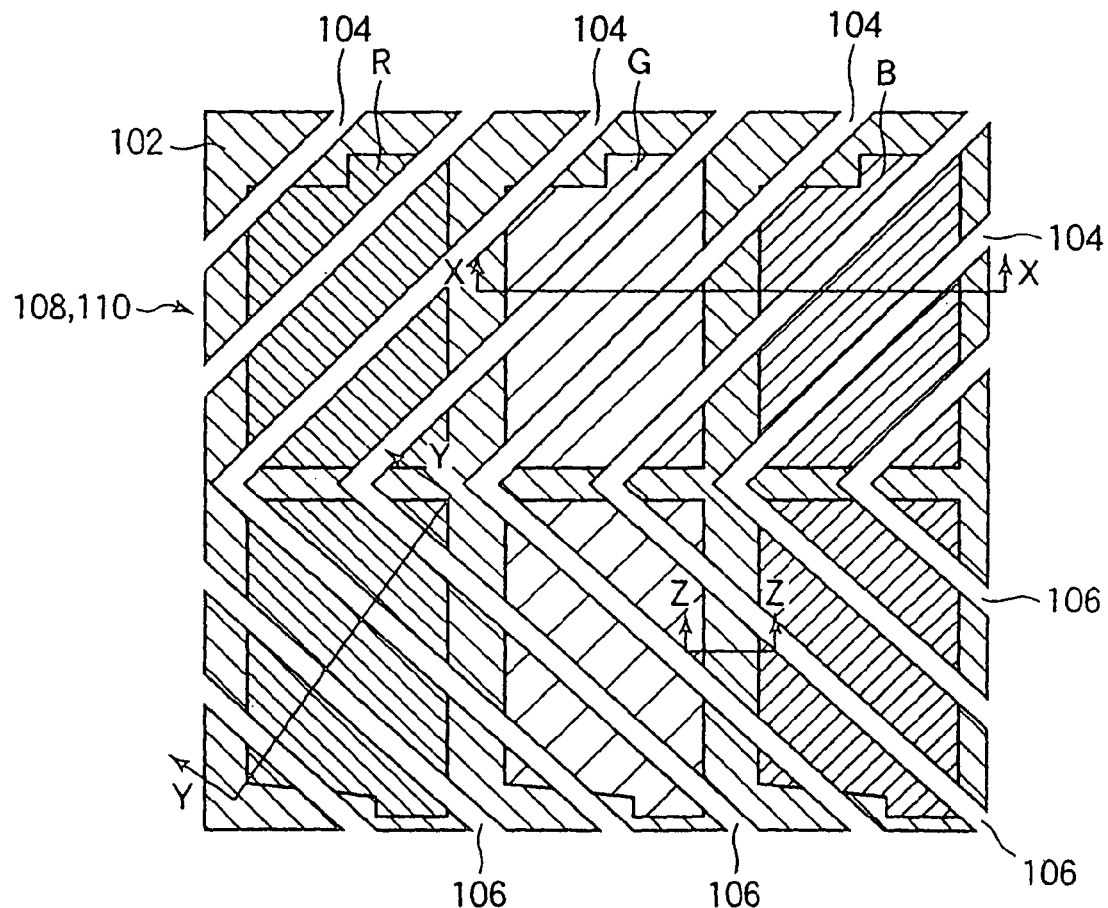
FIG. 35 shows a configuration of a conventional liquid crystal display.
Figure 36:
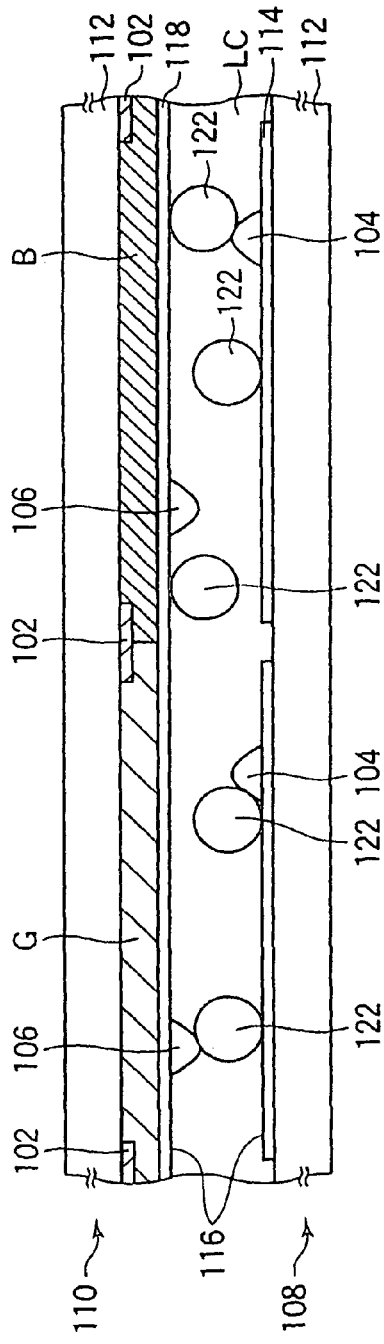
FIG. 36 is a sectional view showing the configuration of the conventional liquid crystal display.
Figure 37:
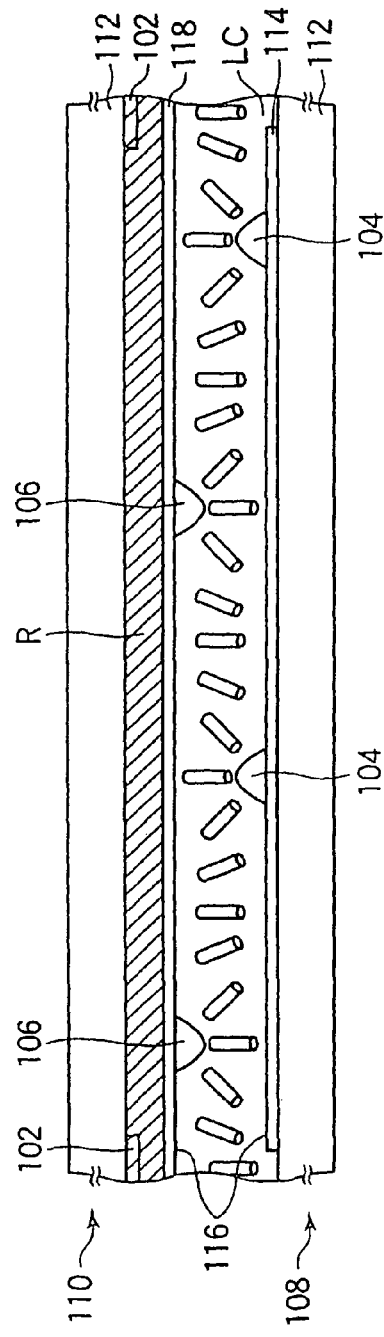
FIG. 37 is a sectional view showing the configuration of the conventional liquid crystal display.
Figure 40:
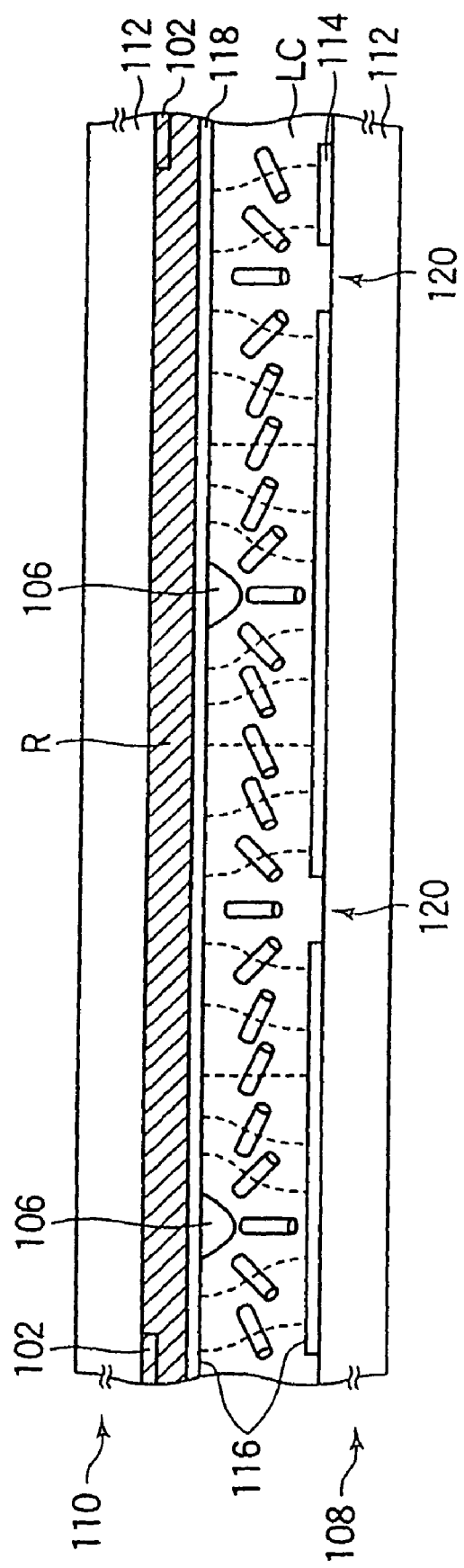
FIG. 40 is a sectional view showing the configuration of the conventional liquid crystal display.

A description will be first made on a substrate for a liquid crystal display according to Embodiment 3-2, a liquid crystal display having the same, and a method of manufacturing the same with reference to FIGS. 34A and 34B. FIGS. 34A and 34B are sectional views of the substrate for a liquid crystal display of the present embodiment showing a configuration of the same. While the substrate for a liquid crystal display of Embodiment 3-1 has TFTs 42 with a channel protection film, the substrate for a liquid crystal display of the present embodiment has channel-etched TFTs 66 as shown in FIGS. 34A and 34B.

A description will now be made on a substrate for a liquid crystal display according to the present embodiment, a liquid crystal display having the same, and a method of manufacturing the same. First, for example, an Al layer having a thickness of 100 nm and a Ti layer having a thickness of 50 nm are formed in the same order on an entire surface of a glass substrate 12 and are patterned to form gate bus lines 25 and storage capacity bus lines. Next, for example, a SiN film having a thickness of 350 nm, an a-Si layer having a thickness of 120 nm, and an $n^+$a-Si layer having a thickness of 30 nm are continuously formed. Next, the $n^+$a-Si layer and a-Si layer are patterned in the form of islands to form active semiconductor layers 52' and n-type semiconductor layers (not, shown) located on the same. Next, for example, a MoN film having a thickness of 50 nm, an Al film having a thickness of 150 nm, a MoN film having a thickness of 70 nm, and a Mo film having a thickness of 10 nm are continuously formed and patterned, and element isolation is then carried out to form source electrodes 46, drain electrodes 44, and storage capacity electrodes. The channel-etched TFTs 66 are completed through the above-described steps. Subsequent steps are not illustrated and described because they are similar to those in the method of manufacturing the liquid crystal display of Embodiment 3-1 shown in FIGS. 27 through 33B.

A method of manufacturing a substrate for a liquid crystal display according to another embodiment of the invention will now be described. Although not shown, features having the same functions and operations as those of the features shown in FIGS. 34A and 34B will be described using like reference numbers. The substrate for a liquid crystal display of the present embodiment has top-gate type TFTs 42. First, for example, a Ti layer having a thickness of 20 nm, an Al layer having a thickness of 75 nm, a Ti layer having a thickness of 40 nm, and an $n^+$a-Si layer having a thickness of 30 nm are formed on a glass substrate 12 and are patterned to form drain electrodes 44 and source electrodes 46. Next, for example, an a-Si layer having a thickness of 30 nm, a SiN film having a thickness of 350 nm, and an Al layer having a thickness of 100 nm are formed and patterned to form active semiconductor layers 52', an insulation film 24, and gate bus lines 25 simultaneously. The semiconductor layers 52', insulation films 24, and gate bus lines 25 may be sequentially formed instead of forming them simultaneously. The top-gate type TFTs 42 are completed through the above-described steps. Although storage capacity bus lines 62 and storage capacity electrodes 64 are not formed in the present embodiment, they may be obviously formed. Subsequent steps will not be described because they are substantially similar to those of the method of manufacturing the liquid crystal display of Embodiment 3-1 shown in FIGS. 27 through 33B. In the present embodiment, since the top metal layer is the gate metal layer, the gate metal layer is coated with the resin CF layer that is formed first.

A method of manufacturing a substrate for a liquid crystal display according to still another embodiment of the invention will now be described. Although not shown, features having the same functions and operations as those of the features shown in FIGS. 34A and 34B will be described using like reference numbers. The substrate for a liquid crystal display of the present embodiment has TFTs in which polysilicon (p-Si) is used for active semiconductor layers 52. First, for example, a SiN film having a thickness of 50 nm, a $SiO_2$ film having a thickness of 200 nm, and an a-Si layer having a thickness of 40 nm are formed on a glass substrate 12, and the resultant substrate is subjected to a heat treatment in an annealing oven to be dehydrogenized. Next, the a-Si layer is irradiated with a predetermined laser to be crystallized and is then patterned to form a p-Si layer. Next, for example, a $SiO_2$ film having a thickness of 110 nm and a AlNd film having a thickness of 300 nm are formed and patterned to form insulation films (gate insulation films) 24 and gate bus lines 25.

The p-Si layer is then doped with phosphorus (P) ions to form N-type regions selectively, and the p-Si layer is subsequently doped with boron (B) ions to form P-type regions selectively. Next, for example, a $SiO_2$ film having a thickness of 60 nm and a SiN film having a thickness of 370 nm are formed to form an interlayer insulation film. The interlayer insulation film on the high density impurity regions is then removed to form contact holes. Next, for example, a Ti layer having a thickness of 100 nm, an Al layer having a thickness of 200 nm, and a Ti layer having a thickness of 100 nm are formed and patterned to form drain electrodes 44 and source electrodes 46. TFTs 70 in which p-Si is used for active semiconductor layers are completed through the above-described steps. Although storage capacity bus lines and storage capacity electrodes are not formed in the present embodiment, it is obviously possible to form storage capacity bus lines simultaneously with the gate bus lines from the same material and to form storage capacity electrodes simultaneously with the source and drain electrodes from the same material.

While the top metal layer is covered by the resin CF layer that is formed first in the above-described embodiment, the top metal layer may be covered by resin to serve as a black matrix or resin to serve as a part of columnar spacers before the resin CF layer is formed. While a black matrix is formed by laminating two resin CF layers, i.e., the first and second resin CF layers or the first and third resin CF layers on the TFTs 42 and bus lines 25, 26, and 62 in the above-described embodiment, the black matrix may be formed by staking all of the three resin CF layers. It is not necessary to form the resin CF layers if black matrix is formed at a different step.

Further, while the pixel electrodes 14 in the above-described embodiment are formed with the slits 20 and finer slits 21 because the described example is a polymer-fixed liquid crystal display, other alignment regulating structures may be used. While the entire top metal layer is covered with a resin CF layer in the above-described embodiment, only edge portions of the top metal layer may be covered. Obviously, the substrate for a liquid crystal display may have a structure which does not include the storage capacity bus lines 62 made of the same material as that of the gate bus lines 25 and the storage capacity electrodes 64 made of the same material as that of the source electrodes 44 and drain electrodes 46.

As described above, in the present mode for carrying out the invention, the source/drain metal layer (a gate metal layer in the case of a top-gate structure) is covered by the resin CF layer that is formed first. This prevents the source/drain layer from being corroded by a CF developer when the resin CF layers are patterned. Since this prevents any increase in the bus line resistance and breakage of the bus lines, an improved yield of manufacture can be achieved. Further, the active semiconductor layers 52 will not be contaminated. There is no increase in the number of manufacturing steps because it is not necessary to form a protective film on the source/drain metal layer.

The liquid crystal display in the present mode for carrying out the invention is free from any reduction or irregularity of luminance attributable to a reduction in retention and burning of patterns. Since the resin CF layers R, G and B formed on the TFTs 42 absorb ultraviolet light applied to form a polymeric structure, there will be no display defect such as crosstalk or a flicker which is otherwise caused by abnormality in the characteristics of the TFTs 42.

Since the alignment of liquid crystal molecules is separated in four directions in the liquid crystal display in the present mode for carrying out the invention, a wide viewing angle is provided, and high contrast can be achieved by vertical alignment. Further, since the tilting direction of liquid crystal molecules is regulated by a polymeric structure, high speed response can be achieved.

The invention is not limited to the above-described modes for carrying out the same may be modified in various ways.

For example, the pixel electrodes 14 are formed directly on the resin CF layers R, G and B in the above-described modes for carrying out the invention. The invention is not limited to such a configuration, and a protective film made of an organic or inorganic material may be formed on the resin CF layers R, G and B, and the pixel electrodes 14 maybe formed on the protective film. The formation of such a protective film makes it possible to prevent the liquid crystal from being contaminated by the material of the resin CF layers and to prevent line breakage through a reduction in steps at the pixel electrodes 14. The resin CF layers R, G and B may be formed in any order, and the materials, configurations and thicknesses of the TFTs 42 and resin CF layers R, G and B are not limited to those described in the above modes for carrying out the invention.

While transmission type liquid crystal displays have been referred to in the above-described modes for carrying out the invention, the invention is not limited to them and may be applied to reflection type liquid crystal displays. While MVA type liquid crystal displays have been referred to in the above-described modes for carrying out the invention, the invention is not limited to them and may be applied to liquid crystal displays in other modes such as the TN mode.

As thus described, the present invention makes it possible to provide a liquid crystal display having high luminance and preferable display characteristics.

What is claimed is:
1. A liquid crystal display configured to enclose liquid crystal comprising:
   a thin film transistor substrate including a first substrate, a plurality of bus lines formed on the first substrate such that they intersect each other, pixel regions defined by the bus lines, a thin film transistor formed in each of the pixel regions, a resin color filter layer formed of a plu- rality of different color layers and in each of the pixel regions, and a pixel electrode formed in each of the pixel regions;

a common electrode substrate including a second substrate and a common electrode formed on the second substrate, the common electrode substrate being provided in a face-to-face relationship with the first substrate;

a liquid crystal sealed between the thin film transistor substrate and the common electrode substrate; and a columnar spacer having laminated resin layers including the resin color filter layer and a second resin layer made of photosensitive acrylic resin, both the second resin layer and each of the different color layers being configured to be in contact with the liquid crystal, for maintaining a cell gap between the thin film transistor substrate and the common electrode substrate, wherein at least surfaces of the bus lines facing the first substrate are formed from a low reflection material, wherein one of the plurality of bus lines is located directly below the columnar spacer, wherein another of the plurality of bus lines separates a first resin color filter layer of the resin color filter layer from a second resin color filter layer of the resin color filter layer thin film transistor substrate when viewed in a direction perpendicular to the thin film transistor substrate.

2. A liquid crystal display according to claim 1, wherein the second substrate is lighter in weight than the first substrate.

3. A liquid crystal display according to claim 1, wherein the second substrate is formed from a glass material including alkaline components.

4. A liquid crystal display according to claim 3, wherein the glass material includes 1% or more alkaline components.

5. A liquid crystal display according to claim 1, wherein the second substrate is formed from a resin material.

6. A liquid crystal display according to claim 1, wherein at least surfaces of a drain electrode and a source electrode of the thin film transistor facing the first substrate are formed from a low reflection material.

7. A liquid crystal display according to claim 1, wherein the second substrate has a thickness smaller than that of the first substrate.

8. A liquid crystal display according to claim 1, wherein the thin film transistor substrate is located adjacent to a display side.

9. A liquid crystal display configured to enclose liquid crystal according to claim 1,
wherein the resin layer made of photosensitive acrylic resin has a width that is approximately equal to a width of the resin color filter layer.

10. A liquid crystal display configured to enclose liquid crystal according to claim 1,
further comprising an alignment regulating structure for regulating the alignment of the liquid crystal,
wherein the resin layer made of photosensitive acrylic resin is made from a same material as the alignment regulating structure.

11. A liquid crystal display according to claim 1, wherein the one bus line located directly below the columnar spacer has a side extending between the thin film transistor substrate and the common electrode substrate, the side at an intersection of different color layers of the color filter layer when viewed in the direction perpendicular to the thin film transistor substrate.

* * * * *